US012717745B2

(12) United States Patent
Chen et al.

(10) Patent No.: US 12,717,745 B2
(45) Date of Patent: Aug. 25, 2026

(54) RECOGNITION APPARATUS FOR TOPOLOGY AND SERVER

(71) Applicant: Suzhou MetaBrain Intelligent Technology Co., Ltd., Suzhou (CN)

(72) Inventors: Chung-Yu Chen, Suzhou (CN); Mingduo Kao, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 19/121,014

(22) PCT Filed: Sep. 12, 2024

(86) PCT No.: PCT/CN2024/118567
§ 371 (c)(1),
(2) Date: Apr. 14, 2025

(87) PCT Pub. No.: WO2025/055933
PCT Pub. Date: Mar. 20, 2025

(65) Prior Publication Data
US 2026/0111381 A1 Apr. 23, 2026

(30) Foreign Application Priority Data
Sep. 12, 2023 (CN) ......................... 202311169400.0

(51) Int. Cl.
*G06F 13/40* (2006.01)
*G06F 13/42* (2006.01)

(52) U.S. Cl.
CPC ...... *G06F 13/4022* (2013.01); *G06F 13/4221* (2013.01); *G06F 2213/0026* (2013.01); *G06F 2213/40* (2013.01)

(58) Field of Classification Search
None
See application file for complete search history.

(56) References Cited

U.S. PATENT DOCUMENTS 10,585,833 B1 * 3/2020 Lien .................... G06F 13/4022
2016/0267039 A1 9/2016 Suto
(Continued)

FOREIGN PATENT DOCUMENTS

CN 108845970 A 11/2018
CN 109002591 A 12/2018
(Continued)

OTHER PUBLICATIONS

International Search Report of corresponding PCT application (PCT/CN2024/118567), mailed Dec. 27, 2024, 9 pages.
(Continued)

*Primary Examiner* — Idriss N Alrobaye
*Assistant Examiner* — Dayton Lewis-Taylor
(74) *Attorney, Agent, or Firm* — COOPER LEGAL GROUP LLC

(57) ABSTRACT

A recognition apparatus and a server are disclosed. The recognition apparatus includes: a first switch circuit, configured to be connected to a cascade interface of a first switch; a second switch circuit, configured to be connected to a switch interface of a second switch; a first expander circuit, configured be connected to an interface of a first processor; and a second expander circuit, configured to be connected to an interface of a second processor. The first switch circuit outputs different level states when the first switch circuit is connected to the switch interface and when the first switch circuit is not connected to the switch interface. The second switch circuit outputs different level states when the second switch circuit is connected to the first expander circuit and the second switch circuit is connected to the second expander circuit.

20 Claims, 17 Drawing Sheets

(56) References Cited

U.S. PATENT DOCUMENTS

| | | | | |
|---|---|---|---|---|
| 2018/0052793 | A1* | 2/2018 | Fang | G06F 13/385 |
| 2025/0068537 | A1* | 2/2025 | Ma | G06F 11/3006 |

FOREIGN PATENT DOCUMENTS

| | | | |
|---|---|---|---|
| CN | 111555628 | A | 8/2020 |
| CN | 112181888 | A | 1/2021 |
| CN | 112306947 | A | 2/2021 |
| CN | 115827518 | A | 3/2023 |
| CN | 115905094 | A | 4/2023 |
| CN | 115954702 | A | 4/2023 |
| CN | 116909980 | A | 10/2023 |
| WO | 2019227837 | A1 | 12/2019 |

OTHER PUBLICATIONS

Written Opinion of International Searching Authority of corresponding PCT application (PCT/CN2024/118567), mailed Dec. 27, 2024, 9 pages.

First Office Action of corresponding CN priority application (CN202311169400.0), mailed Oct. 25, 2023, 6 pages.

Notification to Grant Patent Right for Invention of corresponding CN priority application (CN202311169400.0), mailed Nov. 23, 2023, 2 pages.

* cited by examiner

RECOGNITION APPARATUS FOR TOPOLOGY AND SERVER

CROSS-REFERENCE TO RELATED APPLICATION

The present application claims priority to Chinese Patent Application No. 202311169400.0, filed with the China National Intellectual Property Administration on Sep. 12, 2023 and entitled "RECOGNITION APPARATUS FOR TOPOLOGY AND SERVER", which is incorporated herein by reference in its entirety.

FIELD

The present application relates to the technical field of peripheral component interconnect express (PCIe) topologies, and in particular, to a recognition apparatus for a topology and a server.

BACKGROUND

Due to operational requirements in the fields of artificial intelligence (AI), big data, cloud computing, and the like, AI servers of various architectures are widely used. A combination of a central processing unit (CPU) and a graphics processing unit (GPU) is a common combination of computing units of the AI server.

There are three typical Peripheral Component Interconnect Express (PCIe) topologies in application scenarios of the AI server: a balance mode, a common mode, and a cascade mode. Each topology mode corresponds to one topology. In terms of hardware, different topologies are implemented by matching different cable configurations with corresponding PCIe switch (SW) firmware (FW).

The three PCIe topologies have different peer-to-peer (P2P) bandwidths, delays, operational performance, or deep learning inference analysis capabilities. Therefore, each of the three PCIe topologies has its own advantages and disadvantages, and is suitable for a corresponding application scenario. Therefore, correctness of a PCIe cable connection relationship needs to be confirmed when the AI server is assembled and produced, to ensure that the PCIe topology meets a requirement of a customer upon shipment.

Currently, it is usually visually checked whether a cable connection manner is correct. However, due to intricate cable routing in a system and a need to individually confirm the cables one by one, the entire process consumes a significant amount of manpower and time, resulting in low efficiency.

SUMMARY

In view of this, the present application provides a recognition apparatus for a topology and a server.

According to a first aspect, the present application provides the recognition apparatus for the topology, including a first switch circuit, a second switch circuit, a first expander circuit, and a second expander circuit.

The first switch circuit is configured to be connected to a cascade interface of a first switch. The second switch circuit is configured to be connected to a switch interface of a second switch. In a cascade mode, the cascade interface is connected to the switch interface of the second switch.

The first expander circuit is configured to be connected to an interface of a first processor. The second expander circuit is configured to be connected to an interface of a second processor. In a balance mode, the switch interface of the second switch is connected to the interface of the second processor. In a common mode, the switch interface of the second switch is connected to the interface of the first processor.

The first switch circuit outputs different level states under a condition that the first switch circuit is connected to the switch interface of the second switch and under a condition that the first switch circuit is not connected to the switch interface of the second switch.

The second switch circuit outputs the different level states under a condition that the second switch circuit is connected to the first expander circuit and under a condition that the second switch circuit is connected to the second expander circuit.

In some implementations, the first switch circuit is an active switch circuit or a passive switch circuit. The second switch circuit is the active switch circuit or the passive switch circuit. The first expander circuit is the pull-up circuit or the pull-down circuit. The second expander circuit is the pull-up circuit or a pull-down circuit. The first expander circuit is the pull-down circuit when the second expander circuit is the pull-up circuit. In some embodiments, the first expander circuit is the pull-up circuit under a condition that the second expander circuit is a pull-down circuit.

- under a condition that the active switch circuit or the passive switch circuit is connected to the pull-up circuit, the active switch circuit or the passive switch circuit outputs a first level state;
- under a condition that the active switch circuit or the passive switch circuit is connected to the pull-down circuit, the active switch circuit or the passive switch circuit outputs a second level state;
- under a condition that the active switch circuit is connected to the passive switch circuit, both the active switch circuit and the passive switch circuit output the first level state;
- under a condition that two active switch circuits are connected to each other, both the active switch circuits output the first level state; or
- under a condition that two passive switch circuits are connected to each other, the two passive switch circuits output the second level state.

The second level state is a low level under a condition that the first level state is a high level. In some embodiments, the second level state is the high level under a condition that the first level state is the low level.

In some implementations, the recognition apparatus further includes a third expander circuit.

The third expander circuit is configured to be connected to a first slot. The first slot is connected to the first switch. In the balance mode or the common mode, the cascade interface is connected to the first slot.

The first switch circuit outputs the different level states under a condition that the first switch circuit is connected to the switch interface of the second switch and under a condition that the first switch circuit is connected to the third expander circuit.

In some implementations, the second switch includes a first switch interface. The second switch circuit is configured to be connected to the first switch interface.

In the balance mode, the first switch interface is connected to the interface of the second processor. In the common mode, the first switch interface is connected to the interface of the first processor. In the cascade mode, the cascade interface is connected to the first switch interface.

The first switch circuit outputs the different level states under a condition that the first switch circuit is connected to the second switch circuit and under a condition that the first switch circuit is connected to the third expander circuit.

In some implementations, the third expander circuit is the pull-down circuit under a condition that the first switch circuit is the passive switch circuit and the second switch circuit is the active switch circuit;

- the third expander circuit is the pull-down circuit under a condition that the first switch circuit is the active switch circuit and the second switch circuit is the passive switch circuit;
- the third expander circuit is the pull-down circuit under a condition that both the first switch circuit and the second switch circuit are active switch circuits; and
- the third expander circuit is the pull-up circuit under a condition that both the first switch circuit and the second switch circuit are passive switch circuits.

In some implementations, the recognition apparatus further includes a third switch circuit. The second switch circuit includes a first switch interface and a second switch interface.

The second switch circuit is configured to be connected to the first switch interface. The third switch circuit is configured to be connected to the second switch interface.

In the balance mode, the first switch interface is connected to the interface of the second processor. In the common mode, the first switch interface is connected to the interface of the first processor. In the cascade mode, the cascade interface is connected to the second switch interface.

The first switch circuit outputs the different level states under a condition that the first switch circuit is connected to the third switch circuit and under a condition that the first switch circuit is connected to the third expander circuit.

In some implementations, the third expander circuit is the pull-down circuit under a condition that both the first switch circuit and the third switch circuit are active switch circuits;

- the third expander circuit is the pull-down circuit under a condition that the first switch circuit is the active switch circuit and the third switch circuit is the passive switch circuit;
- the third expander circuit is the pull-down circuit under a condition that the first switch circuit is the passive switch circuit and the third switch circuit is the active switch circuit; or
- the third expander circuit is the pull-up circuit under a condition that both the first switch circuit and the third switch circuit are passive switch circuits.

According to the present application, based on a level state output by the first switch circuit and a level state output by the second switch circuit, a current topology mode may be determined conveniently, that is, whether the current topology mode is the balance mode, the common mode, or the cascade mode may be determined.

In some implementations, the recognition apparatus further includes a third switch circuit. The second switch circuit includes a first switch interface and a second switch interface.

The second switch circuit is configured to be connected to the first switch interface. The third switch circuit is configured to be connected to the second switch interface. In the balance mode, the first switch interface is connected to the interface of the second processor. In the common mode, the first switch interface is connected to the interface of the first processor. In the cascade mode, the cascade interface is connected to the first switch interface or the second switch interface.

Three level states output by the first switch circuit, the second switch circuit, and the third switch circuit under a condition that the cascade interface is connected to the first switch interface or the second switch interface are not totally the same as three level states output by the first switch circuit, the second switch circuit, and the third switch circuit in the balance mode or the common mode.

In some implementations, the first switch circuit outputs a same level state under a condition that the first switch circuit is connected to the second switch circuit and under a condition that the first switch circuit is connected to the third switch circuit.

In some implementations, the first switch circuit is an active switch circuit; or

- the first switch circuit is the passive switch circuit, and both the second switch circuit and the third switch circuit are active switch circuits.

In some implementations, the recognition apparatus further includes a third expander circuit. The third expander circuit is the pull-down circuit.

The third expander circuit is configured to be connected to a first slot.

The first slot is connected to the first switch. In the balance mode or the common mode, the cascade interface is connected to the first slot.

In some implementations, the recognition apparatus further includes a third expander circuit. The third expander circuit is the pull-up circuit.

The third expander circuit is configured to be connected to a first slot.

The first slot is connected to the first switch. In the balance mode or the common mode, the cascade interface is connected to the first slot.

The first switch circuit, the second switch circuit, and the third switch circuit are all passive switch circuits.

According to the recognition apparatus for the topology provided in the present application, cascade modes in which different connection manners are used have no impact on the level state output by the first switch circuit, and the current topology mode may be recognized.

In some implementations, the first switch circuit outputs the different level states under a condition that the first switch circuit is connected to the second switch circuit and under a condition that the first switch circuit is connected to the third switch circuit.

The third switch circuit outputs the different level states under a condition that the third switch circuit is connected to the first switch circuit and under a condition that the third switch circuit is not connected to the first switch circuit.

In some implementations, the recognition apparatus further includes a fourth expander circuit. The fourth expander circuit is configured to be connected to a second slot. The second slot is connected to the second switch. In the balance mode or the common mode, the second switch interface is connected to the second slot.

The third switch circuit outputs different level states under a condition that the third switch circuit is connected to the first switch circuit and under a condition that the third switch circuit is connected to the fourth expander circuit.

In some implementations, the first switch circuit is a passive switch circuit. The second switch circuit is an active switch circuit. The third switch circuit is a passive switch circuit. A third expander circuit is a pull-down circuit. The fourth expander circuit is a pull-up circuit. The recognition apparatus further includes the third expander circuit. The third expander circuit is configured to be connected to a first slot. The first slot is connected to the first switch. In the balance mode or the common mode, the cascade interface is connected to the first slot.

In some implementations, a third expander circuit is a pull-up circuit. The fourth expander circuit is a pull-down circuit. The first switch circuit is a passive switch circuit. The second switch circuit is a passive switch circuit. The third switch circuit is an active switch circuit. The recognition apparatus further includes the third expander circuit. The third expander circuit is configured to be connected to a first slot.

The first slot is connected to the first switch. In the balance mode or the common mode, the cascade interface is connected to the first slot.

According to the recognition apparatus for the topology provided in the present application, when cascade modes in which different connection manners are used have impact on an output of the first switch circuit, with reference to three level states output by the three switch circuits, the current topology mode may still be recognized, and it may be determined whether the current topology mode is the balance mode, the common mode, a cascade mode 1, or a cascade mode 2.

In some implementations, the active switch circuit includes a first transistor, a first voltage divider resistor, and a first current limiting resistor.

A first end of the first voltage divider resistor is connected to a power supply, and a second end of the first voltage divider resistor is connected to a control end of the first transistor.

A first end of the first current limiting resistor is connected to the power supply. A second end of the first current limiting resistor is connected to a first end of the first transistor.

A second end of the first transistor is grounded. The control end of the first transistor controls whether the first end and the second end of the first transistor are conducted. The control end of the first transistor is configured to be connected to an interface of a switch. The first end of the first transistor is configured to output a level state.

In some implementations, the pull-down circuit includes a grounded pull-down circuit. Resistance of the first voltage divider resistor and resistance of the pull-down resistor satisfy:

$$VCC_1 \times R_{down}/(R_{down}+R_{11}) < Vth_1,$$

where $VCC_1$ represents a voltage value of the power supply to which the first voltage divider resistor is connected, $R_{11}$ represents the resistance of the first voltage divider resistor, $R_{down}$ represents the resistance of the pull-down resistor, and $Vth_1$ represents an on voltage of the first transistor.

In some implementations, the passive switch circuit includes a second transistor, a second voltage divider resistor, and a second current limiting resistor.

A first end of the second voltage divider resistor is connected to a control end of the second transistor. A second end of the second voltage divider resistor is grounded.

A first end of the second current limiting resistor is connected to a power supply. A second end of the second current limiting resistor is connected to a first end of the second transistor.

A second end of the second transistor is grounded, the control end of the second transistor controls whether the first end and the second end of the second transistor are conducted. The control end of the second transistor is configured to be connected to an interface of a switch. The first end of the second transistor is configured to output a level state.

In some implementations, the pull-up circuit includes a pull-up circuit connected to the power supply. Resistance of the second voltage divider resistor and resistance of the pull-up resistor satisfy:

$$VCC_2 \times R_{21}/(R_{up}+R_{21}) > Vth_2,$$

where $VCC_2$ represents a voltage value of the power supply to which the pull-up resistor is connected, $R_{21}$ represents the resistance of the second voltage divider resistor, $R_{up}$ represents the resistance of the pull-up resistor, and $Vth_2$ represents an on voltage of the second transistor.

In some implementations, the recognition apparatus further includes a controller.

The controller is connected to output ends of a plurality of switch circuits. The controller is configured to determine the current topology mode based on level states output by the plurality of switch circuits.

The plurality of switch circuits includes the first switch circuit and the second switch circuit.

According to a second aspect, the present application provides a server, including a first processor, a second processor, a first switch, a second switch, and any recognition apparatus according to the first aspect.

In some implementations, the server further includes a baseboard management controller (BMC). The BMC is connected to the controller of the recognition apparatus. The BMC is configured to obtain a current topology mode determined by the controller.

BRIEF DESCRIPTION OF THE DRAWINGS

To describe the technical solutions in implementations of the present application or in the related art more clearly, the following briefly describes the accompanying drawings required for describing the implementations or the related art. Apparently, the accompanying drawings in the following description show merely some implementations of the present application, and a person of ordinary skill in the art may still derive other drawings from these accompanying drawings without creative efforts.

DESCRIPTION OF REFERENCE SIGNS

110: first switch circuit; 120: second switch circuit; 130: third switch circuit; 210: first expander circuit; 220: second expander circuit; 230: third expander circuit; 240: fourth expander circuit; 300: controller; S5: cascade interface; S1: first switch interface; S0: second switch interface; CPU0: first processor; CPU1: second processor; SW_A: first switch; SW_B: second switch; SLOT4: first slot; SLOT6: second slot; Q1: first transistor; R11: first voltage divider resistor; R12: first current limiting resistor; Q2: second transistor; R21: second voltage divider resistor; R22: second current limiting resistor.

DETAILED DESCRIPTION

In order to make objectives, technical solutions, and advantages of embodiments of the present application clearer, the following clearly and completely describes the technical solutions in the embodiments of the present application with reference to the accompanying drawings in the embodiments of the present application. Apparently, the described embodiments are some but not all the embodiments of the present application. All other embodiments obtained by a person skilled in the art based on the embodiments of the present application without creative efforts shall fall within the protection scope of the present application.

It should be noted that terms "first", "second", "third", and the like in the description of the present application are merely intended for a purpose of description, and may not be understood as indicating or implying relative importance. Unless otherwise expressly specified and defined, terms such as "mount", "connect", and "connected to" should be understood in a broad sense. For example, a "connection" may be a fixed connection, a detachable connection, or an integrated connection; may be a mechanical connection or an electrical connection; or may be a direct connection, an indirect connection through an intermediate medium, or a connection inside two elements. A person of ordinary skill in the art may understand meanings of the foregoing terms in the present application based on situations.

In addition, technical features in different implementations of the present application described below may be mutually combined without conflicts.

Figure 1:
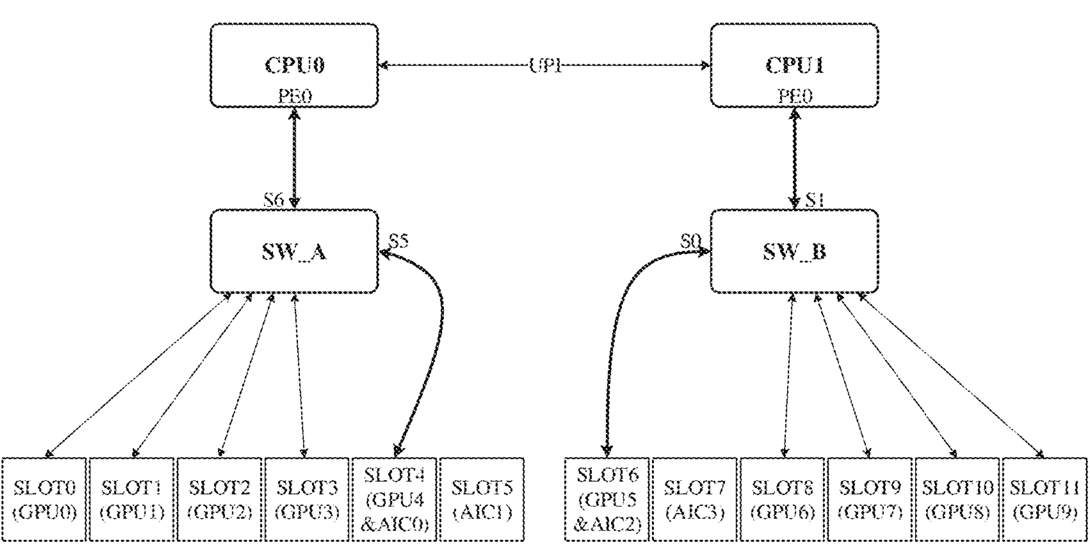
FIG. 1 is a schematic diagram of a topology in a balance mode.
Figure 2:
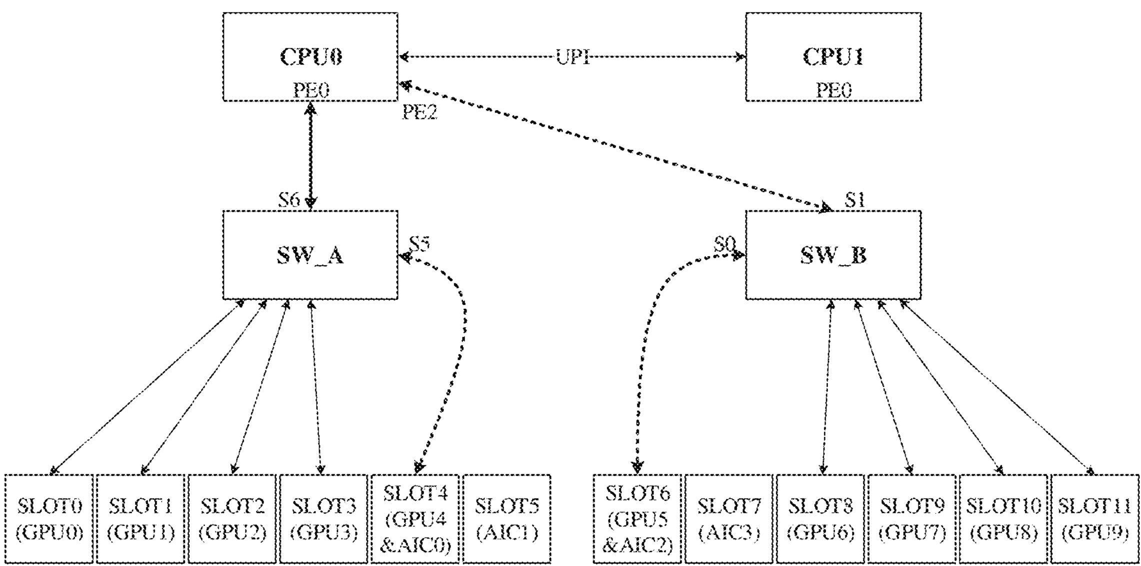
FIG. 2 is a schematic diagram of the topology in a common mode.
Figure 3:
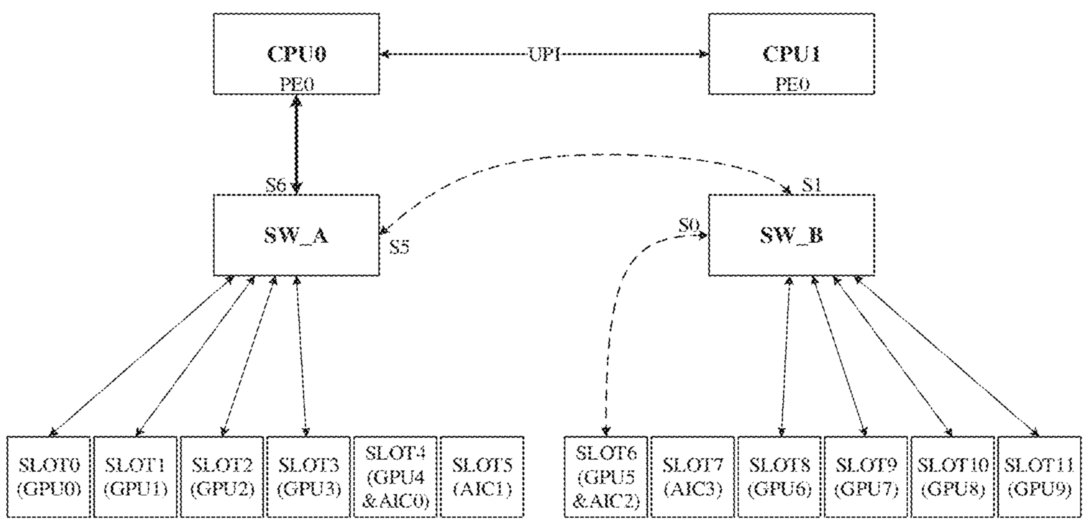
FIG. 3 is a schematic diagram of the topology in a cascade mode.

FIG. 1 to FIG. 3 show three typical PCIe topologies.

FIG. 1 shows a topology in a balance mode. In the balance mode, GPUs are evenly allocated to CPUs, and the CPUs communicate with each other through an ultra-path interconnect (UPI). As shown in FIG. 1, a PCIe interface (PE0) of one CPU CPU0 is connected to one PCIe interface (S6) of a switch SW_A, and other four PCIe interfaces of the switch SW_A are respectively connected to slots (SLOT) of four GPUs GPU0, GPU1, GPU2, and GPU3, that is, SLOT0, SLOT1, SLOT2, and SLOT3. Similarly, a PCIe interface (PE0) of the other CPU CPU1 is connected to one PCIe interface (S1) of a switch SW_B, and other four PCIe interfaces of the switch SW_B are respectively connected to slots of four GPUs GPU6, GPU7, GPU8, and GPU9, that is, SLOT8, SLOT9, SLOT10, and SLOT11.

When the PCIe topology is changed, a PCIe interface connected to a GPU is usually fixed, and the PCIe topology is changed to another PCIe topology by configuring a connection manner for another PCIe interface.

FIG. 2 shows a topology in a common mode. In the common mode, different switches (SWs) are connected to a same CPU. As shown in FIG. 2, the PCIe interface (S1) of the switch SW_B that is connected to the PCIe interface (PE0) of CPU1 is changed to connect to a PCIe interface (PE2) of CPU0. In this way, both the switches SW_A and SW_B are connected to CPU0. Therefore, the balance mode may be changed to the common mode.

FIG. 3 shows a topology in a cascade mode. In the cascade mode, a cascade topology is formed between switches. For example, the switches SW_A and SW_B are cascaded. As shown in FIG. 3, the PCIe interface (S1) of the switch SW_B is connected to a PCIe interface (S5) of the switch SW_A for implementing cascade. In this way, the mode may be changed to the cascade mode. In the balance mode or the common mode, another device may be connected to the PCIe interface (S5) of the switch SW_A for implementing cascade. As shown in FIG. 1 or FIG. 2, the PCIe interface (S5) for implementing cascade may be connected to a slot SLOT4 of the GPU (GPU4) or an add-in card (AIC) device (AIC0).

Figure 4:
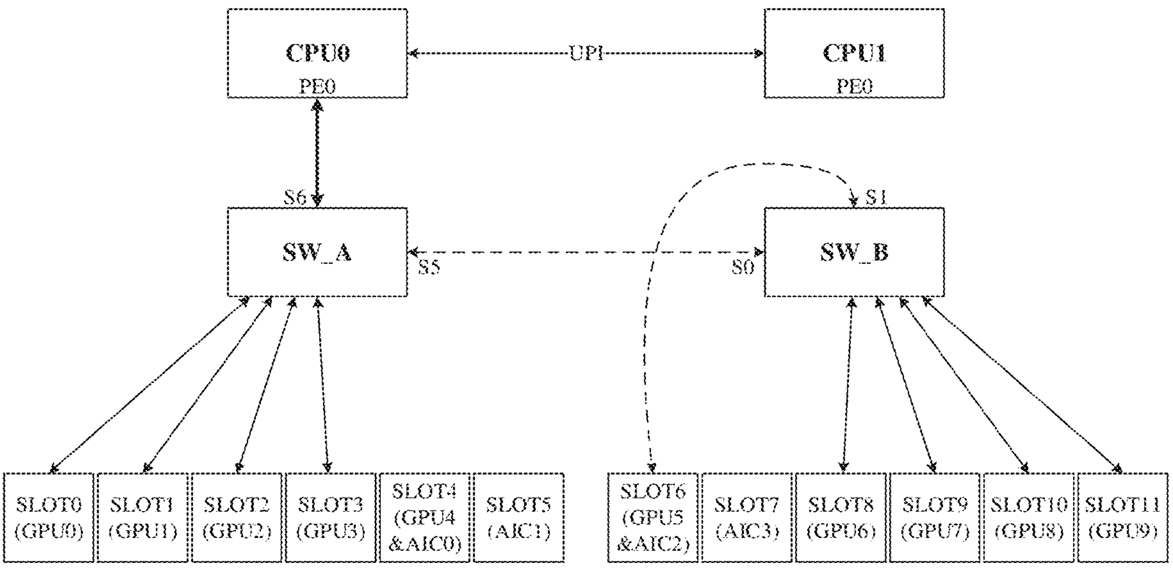
FIG. 4 is a schematic diagram of another topology in the cascade mode.

FIG. 4 shows another topology in a cascade mode. In the cascade mode, a cascade topology is formed between switches. For example, the switches SW_A and SW_B are cascaded. As shown in FIG. 4, a second switch interface S0 of the second switch SW_B is connected to the cascade interface S5 of the first switch SW_A for implementing cascade. In addition, the first switch interface S1 of the second switch SW_B may not be connected to the processor CPU0 or CPU1. In general, in order to effectively utilize an interface resource, the first switch interface S1 may be connected to a second slot SLOT6 that is originally connected to the second switch interface S0, to implement the cascade mode.

When the mode needs to be switched to the cascade mode, as shown in FIG. 3, the cascade interface S5 may be connected to the first switch interface S1, or as shown in FIG. 4, the cascade interface S5 may be connected to the second switch interface S0. In general, a switch interface connected to the cascade interface S5 is selected according to the principle of proximity. For example, when the cascade interface S5 is closer to the second switch interface S0, and the mode needs to be switched to the cascade mode, the topology shown in FIG. 4 may be used, that is, the cascade interface S5 is connected to the second switch interface S0. For ease of subsequent description, the cascade mode shown in FIG. 3 is referred to as a "cascade mode 1", and the cascade mode shown in FIG. 4 is referred to as a "cascade mode 2".

It may be understood that in practice, three modes of the balance mode, the common mode, and the cascade mode 1 may be used, three modes of the balance mode, the common mode, and the cascade mode 2 may be used, or four modes of the balance mode, the common mode, the cascade mode 1, and the cascade mode 2 may be used, and when cascading is needed, one of the cascade mode 1 and the cascade mode 2 is selected for use.

Based on differences between the foregoing several PCIe topologies, some embodiments of the present application provides the recognition apparatus for the topology. Corresponding circuit structures are disposed for some PCIe interfaces, and with cable configurations in different modes, the recognition apparatus may output different high/low-level states, whereby a currently used PCIe topology mode may be recognized.

For ease of description, some concepts in the embodiments of the present application are first explained and described.

First processor and second processor: The three PCIe topologies involve at least two CPUs, one CPU is referred to as the first processor, and another CPU is referred to as the second processor. As shown in FIG. 1 to FIG. 3, CPU0 represents the first processor, and CPU1 represents the second processor.

First switch and second switch: The three PCIe topologies involve at least two switches, one switch is referred to as the first switch, and another switch is referred to as the second switch. As shown in FIG. 1 to FIG. 3, SW_A represents the first switch, and SW_B represents the second switch.

Cascade interface: The first switch has a plurality of PCIe interfaces. In the cascade mode, a PCIe interface of the first switch is connected to a PCIe interface of the second switch, to implement cascading of the first switch and the second switch. For ease of description, the PCIe interface of the first switch is referred to as the cascade interface. It may be understood that the cascade interface is a type of PCIe interface.

For example, as shown in FIG. 3, in the cascade mode, the PCIe interface S5 of the first switch SW_A is connected to the PCIe interface S1 of the second switch. As shown in FIG. 1 and FIG. 2, in the balance mode or the common mode, the PCIe interface S5 of the first switch SW_A does not perform cascading, and is connected to the slot SLOT4. Therefore, the PCIe interface S5 is the cascade interface. In the following, the cascade interface is represented by S5.

First switch interface: The second switch also has a plurality of PCIe interfaces. In the balance mode and the common mode, a PCIe interface of the second switch is connected to PCIe interfaces of the second processor and the first processor respectively. The PCIe interface of the second switch is configured to implement topology switching, and is a switch interface. For ease of description, the PCIe interface of the second switch is referred to as the first switch interface. It may be understood that the first switch interface is also a type of PCIe interface.

For example, as shown in FIG. 1 and FIG. 2, in the balance mode, the PCIe interface S1 of the second switch SW_B is connected to the PCIe interface of the second processor CPU1, and in the common mode, the PCIe interface S1 of the second switch SW_B is connected to the PCIe interface of the first processor CPU0. Therefore, the PCIe interface S1 is the first switch interface. In the following, the first switch interface is represented by S1.

First slot: The first switch may communicate with a plurality of PCIe devices through a plurality of PCIe interfaces, and these PCIe devices are connected to the first switch. In the balance mode or the common mode, the cascade interface of the first switch may also communicate with a PCIe device, where the PCIe device is provided with a slot for communication with a switch. In these embodiments, the slot connected to the cascade interface is referred to as the first slot. It may be understood that the first slot is also a type of PCIe interface.

For example, as shown in FIG. 1 and FIG. 2, in the balance mode or the common mode, the cascade interface S5 of the first switch SW_A is connected to the slot SLOT4, to implement communication with GPU4 or AIC0. The slot SLOT4 is the first slot. In the following, the first slot is represented by SLOT4.

Second switch interface: During switching between different modes, in addition to the first switch interface, a connection manner for the other PCIe interface of the second switch may also change, to implement mode switching. The PCIe interface is referred to as the second switch interface. For example, in FIG. 1 to FIG. 4, the PCIe interface S0 of the second switch SW_B may be the second switch interface. As shown in FIG. 4, under a condition that the mode is switched to the cascade mode, the first switch SW_A may be connected to the second switch interface S0, to switch the mode to the cascade mode.

Second slot: For PCIe devices connected to the second switch, a slot of a PCIe device may communicate with the second switch interface, and the slot of the PCIe interface is referred to as the second slot. For example, as shown in FIG. 1 to FIG. 3, the slot SLOT6 may communicate with the second switch interface S0, whereby the slot SLOT6 is the second slot. It may be understood that the second switch interface and the second slot are also a type of PCIe interface.

Figure 5:
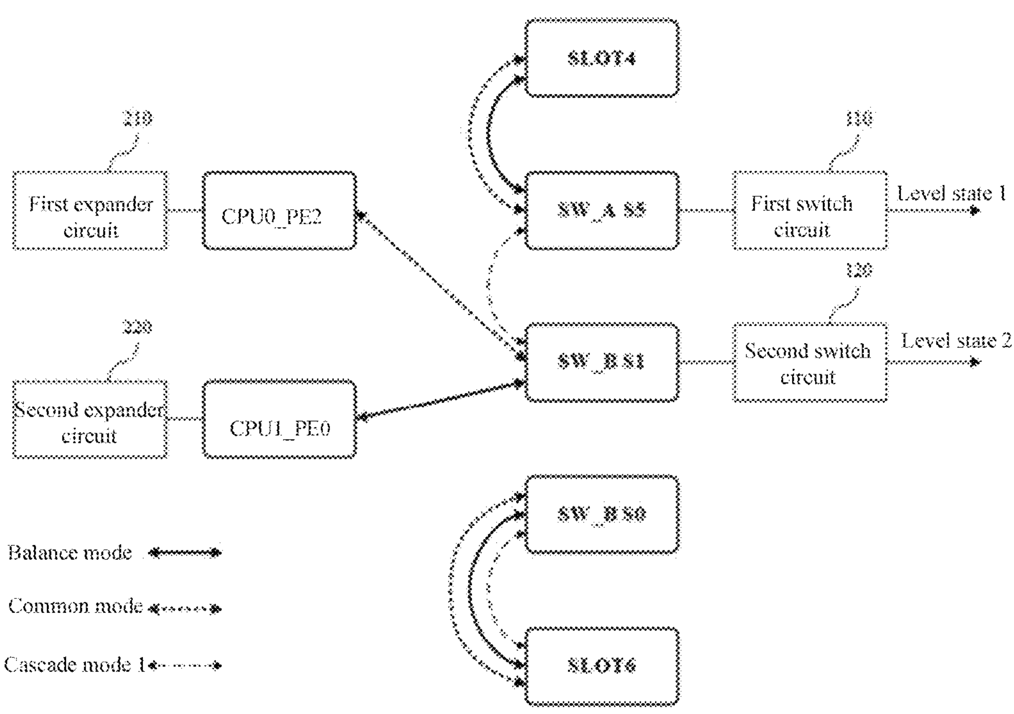
FIG. 5 is a schematic structural diagram of a recognition apparatus for a topology according to some embodiments of the present application.

According to some embodiments of the present application, some embodiments of the recognition apparatus for the topology is provided. FIG. 5 is a schematic structural diagram of the recognition apparatus for the topology according to some embodiments of the present application. As shown in FIG. 5, the recognition apparatus for the topology includes a first switch circuit 110, a second switch circuit 120, a first expander circuit 210, and a second expander circuit 220.

The first switch circuit 110 is configured to be connected to a cascade interface S5 of a first switch SW_A. The second switch circuit 120 is configured to be connected to a first switch interface S1 of a second switch SW_B. In a cascade mode, the cascade interface S5 is connected to a switch interface of the second switch SW_B. For example, as shown in FIG. 5, in a cascade mode 1, a cascade interface S5 is connected to the first switch interface S1 of the second switch SW_B. Correspondingly, the second switch circuit 120 is also connected to the first switch interface S1.

The first expander circuit 210 is configured to be connected to an interface of a first processor CPU0. The second expander circuit 220 is configured to be connected to an interface of a second processor CPU1. In a balance mode, the switch interface of the second switch SW_B is connected to the interface of the second processor CPU1. In a common mode, the switch interface of the second switch SW_B is connected to the interface of the first processor CPU0.

For example, the switch interface of the second switch SW_B may be the first switch interface S1. As shown in FIG. 5, SW_A S5 represents the cascade interface S5 of the first switch SW_A, SW_B S1 represents the first switch interface S1 of the second switch SW_B, CPU0_PE2 represents the interface of the first processor CPU0, and CPU1_PE0 represents the interface of the second processor CPU1. The first switch circuit 110 may be connected to the cascade interface S5. The second switch circuit 120 may be connected to the first switch interface S1. The first expander circuit 210 may be connected to the interface CPU0_PE2. The second expander circuit 220 may be connected to the interface CPU1_PE0.

FIG. 5 shows connection manners for each interface (including the cascade interface S5, the first switch interface S1, and the like) in the balance mode, the common mode, and the cascade mode 1, and these connection manners are in one-to-one correspondence to the connection manners shown in FIG. 1 to FIG. 3.

In the balance mode, as shown in FIG. 1 and FIG. 5, the first switch interface S1 is connected to the interface CPU1_PE0 of the second processor CPU1, the cascade interface S5 is connected to a first slot SLOT4, and the second switch interface S0 is connected to a second slot SLOT6.

In the common mode, as shown in FIG. 2 and FIG. 5, the first switch interface S1 is connected to the interface CPU0_PE2 of the first processor CPU0, the cascade interface S5 is connected to the first slot SLOT4, and the second switch interface S0 is connected to the second slot SLOT6.

In the cascade mode 1, as shown in FIG. 3 and FIG. 5, the first switch interface S1 is connected to the cascade interface S5, and the second switch interface S0 is connected to the second slot SLOT6.

In these embodiments, switch circuits (for example, the first switch circuit 110, and the second switch circuit 120) or expander circuits (for example, the first expander circuit 210 and the second expander circuit 220) are disposed for some PCIe interfaces. Under a condition that two PCIe interfaces are connected, the two circuits disposed in these embodiments may be respectively connected.

In some embodiments, as shown in FIG. 5, under a condition that the first switch interface S1 is connected to the interface CPU0_PE2 of the first processor, the second switch circuit 120 may be connected to the first expander circuit 210. Under a condition that the first switch interface S1 is connected to the interface CPU1_PE0 of the second processor, the second switch circuit 120 may be connected to the second expander circuit 220. Under a condition that the first switch interface S1 is connected to the cascade interface S5, the second switch circuit 120 may be connected to the first switch circuit 110.

For example, a PCIe interface has a plurality of pins, and an idle pin in the plurality of pins may be used. A circuit disposed in these embodiments may be connected to an idle pin of a corresponding PCIe interface. Under a condition that two PCIe interfaces are connected, idle pins of the two PCIe interfaces are connected, to connect two circuits disposed in these embodiments. It may be understood that the first switch circuit 110 is connected to an idle pin of the cascade interface S5, the second switch circuit 120 is connected to an idle pin of the first switch interface S1, the first expander circuit 210 is connected to an idle pin of the interface CPU0_PE2 of the first processor, and the second expander circuit 220 is connected to an idle pin of the interface CPU1_PE0 of the second processor CPU1. These idle pins correspond to a same reference sign.

In these embodiments, both the first switch circuit 110 and the second switch circuit 120 are a type of switch circuit, in which a switch that may be turned on or turned off is disposed, and different level states may be output by controlling the switch whether to be turned on or turned off. For example, the switch circuit outputs a high level when the switch is turned on, and the switch circuit outputs a low level when the switch is turned off. In some embodiments, the switch circuit outputs a low level the switch is turned on, and the switch circuit outputs a high level when the switch is turned off.

The first switch circuit 110 outputs different level states under a condition that the first switch circuit 110 is connected to the switch interface of the second switch SW_B and under a condition that the first switch circuit 110 is not connected to the switch interface of the second switch SW_B, that is, level states 1 are different. Under a condition that the switch interface of the second switch SW_B is the first switch interface S1, and the second switch circuit 120 is connected to the first switch interface S1, the first switch circuit 110 outputs one level state if the first switch circuit 110 is connected to the second switch circuit 120; and the first switch circuit 110 outputs another level state if the first switch circuit 110 is not connected to the second switch circuit 120.

In some embodiments, as shown in FIG. 5, in the cascade mode 1, the cascade interface S5 is connected to the first switch interface S1, that is, the first switch circuit 110 is connected to the second switch circuit 120. In the balance mode or the common mode, the cascade interface S5 is not connected to the first switch interface S1, for example, the cascade interface S5 is not connected to another PCIe interface, or the cascade interface S5 is connected to the first slot SLOT4. In this case, the first switch circuit 110 is not connected to the second switch circuit 120. The first switch circuit 110 outputs different level states in the two cases. Therefore, whether a current topology mode is the cascade mode may be determined based on a level state output by the first switch circuit 110.

In addition, the second switch circuit 120 outputs different level states under a condition that the second switch circuit 120 is connected to the first expander circuit 210 and under a condition that the second switch circuit 120 is connected to the second expander circuit 220, that is, level states 2 are different. In some embodiments, the second switch circuit 120 outputs one level state under a condition that the second switch circuit 120 is connected to the first expander circuit 210; or the second switch circuit 120 outputs another level state under a condition that the second switch circuit 120 is connected to the second expander circuit 220.

In some embodiments, as an example taking the second switch circuit 120 to connect to the first switch interface S1 as an example. As shown in FIG. 5, in the balance mode, the first switch interface S1 is connected to the interface CPU1_PE0, that is, the second switch circuit 120 is connected to the second expander circuit 220. In the common mode, the first switch interface S1 is connected to the interface CPU0_PE2, the second switch circuit 120 may be connected to the first expander circuit 210. The second switch circuit 120 outputs different level states in the two cases. Therefore, the balance mode and the common mode may be distinguished based on a level state output by the second switch circuit 120. For example, when it is determined, based on the level state output by the first switch circuit 110, that the current topology mode is not the cascade mode, that is, the current topology mode is the balance mode or the common mode, and the balance mode and the common mode may be distinguished based on the level state output by the second switch circuit 120.

The level state is classified as a high level and a low level. A level state output by a switch circuit (for example, the first switch circuit 110 and the second switch circuit 120) may be determined based on whether the switch circuit outputs a high level or a low level.

According to the recognition apparatus for the topology provided in these embodiments, the switch circuits that may output level states are respectively disposed for the cascade interface S5 and the switch interface (for example, the first switch interface S1), and the expander circuits are respectively disposed for the interfaces of the two processors. In this way, the first switch circuit and the second switch circuit may output different level states in different topology modes, and the current topology mode may be determined conveniently and quickly based on the level states of the two switch circuits. Based on the recognition apparatus, the current topology mode may be automatically recognized without participation of a human, whereby consumption of human resources and time costs may be reduced, it is convenient for personnel on a production line to directly confirm whether cable locations are correct, and production efficiency may also be improved.

Figure 6:
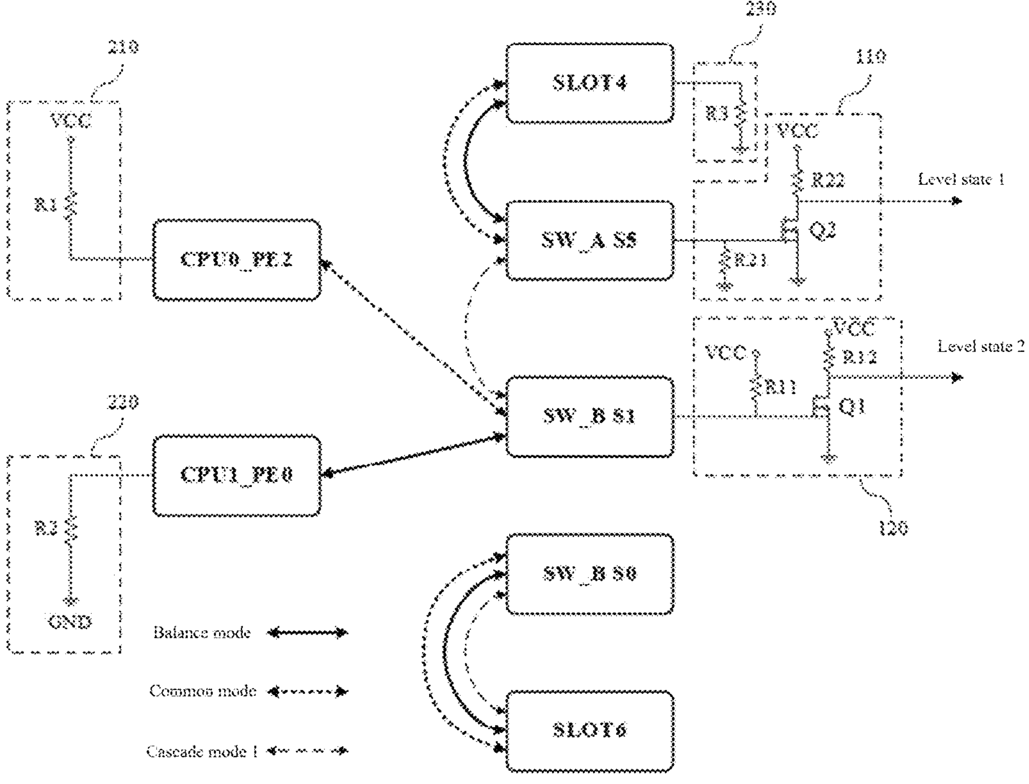
FIG. 6 is a schematic structural diagram of the recognition apparatus for the topology according to some embodiments of the present application.

According to some embodiments of the present application, some embodiments of the recognition apparatus for the topology is provided. FIG. 6 is a schematic structural diagram of the recognition apparatus for the topology according to some embodiments of the present application. As shown in FIG. 6, the recognition apparatus for the topology includes a first switch circuit 110, a second switch circuit 120, a first expander circuit 210, and a second expander circuit 220. For working principles of the first switch circuit 110, the second switch circuit 120, the first expander circuit 210, and the second expander circuit 220, refer to the descriptions of some embodiments shown in FIG. 5. Details are not described herein again.

In these embodiments, one of the first expander circuit 210 and the second expander circuit 220 is a pull-up circuit, and the other is a pull-down circuit. For example, the first expander circuit 210 is the pull-up circuit, and the second expander circuit 220 is the pull-down circuit. In some embodiments, the first expander circuit 210 is the pull-down circuit, and the second expander circuit 220 is the pull-up circuit. The first expander circuit 210 and the second expander circuit 220 are disposed as different circuit structures, whereby the second switch circuit 120 may output a different level state when connected to the first expander circuit 210 or the second expander circuit 220.

A main function of the pull-up circuit is providing a high level. The pull-up circuit mainly includes a pull-up resistor connected to a power supply. As shown in FIG. 6, the first expander circuit 210 is a pull-up circuit, where a resistor R1 is a pull-up resistor, and a power supply VCC may provide a required voltage.

A main function of the pull-down circuit is providing a low level. The pull-down circuit mainly includes a grounded pull-down resistor. As shown in FIG. 6, the second expander circuit 220 is a pull-down circuit, where a resistor R2 is a pull-down resistor, and the resistor R2 is grounded.

In addition, in these embodiments, the first switch circuit 110 is an active switch circuit or a passive switch circuit, and the second switch circuit 120 is the active switch circuit or the passive switch circuit. For example, one of the first switch circuit 110 and the second switch circuit 120 is the active switch circuit, and the other is the passive switch circuit. In some embodiments, both the first switch circuit 110 and the second switch circuit 120 are active switch circuits or passive switch circuits.

The active switch circuit is a switch circuit including a power supply inside. In these embodiments, the active switch circuit is a switch circuit including a power supply inside which may control a switch to be turned on or turned off. Correspondingly, the passive switch circuit is a switch circuit including no power supply inside. In these embodiments, the passive switch circuit is a switch circuit including no power supply inside that may control a switch to be turned on or turned off, and needs to be connected to another external power supply when a level state output by the passive switch circuit needs to be changed.

Either the active switch circuit or the passive switch circuit may output a different level state when connected to a pull-up circuit or a pull-down circuit. In these embodiments, a first level state and a second level state respectively represent different level states. It may be understood that one of the first level state and the second level state is a high level, and the other is a low level.

In some embodiments, under a condition that the active switch circuit or the passive switch circuit is connected to a pull-up circuit, the active switch circuit or the passive switch circuit outputs the first level state. Under a condition that the active switch circuit or the passive switch circuit is connected to a pull-down circuit, the active switch circuit or the passive switch circuit outputs the second level state. In other words, under a condition that a switch circuit is connected to an expander circuit, a level state output by the switch circuit is unrelated to whether the switch circuit is the active switch circuit or the passive switch circuit.

For example, no matter whether the second switch circuit 120 is the active switch circuit or the passive switch circuit, the second switch circuit 120 outputs the first level state when connected to a pull-up circuit (for example, the first expander circuit 210), or the second switch circuit 120 outputs the second level state when connected to a pull-down circuit (for example, the second expander circuit 220).

In addition, under a condition that two switch circuits are connected to each other, for example, under a condition that the first switch circuit 110 is connected to the second switch circuit 120, the two switch circuits output a same level state.

In some embodiments, under a condition that the active switch circuit is connected to the passive switch circuit, both the active switch circuit and the passive switch circuit output the first level state. Under a condition that two active switch circuits are connected to each other, both the active switch circuits output the first level states. Under a condition that two passive switch circuits are connected to each other, both the passive switch circuits the second level state.

In these embodiments, the power supply inside the active switch circuit and the power supply in the pull-up circuit may have similar control effects. Similar to a case of connection to the pull-up circuit, the active switch circuit outputs the first level state when connected to the passive switch circuit or another active switch circuit. Similar to a case in which the passive switch circuit is connected to the pull-down circuit, two passive switch circuits that are connected output the second level state.

For example, in the cascade mode 1, the cascade interface S5 is connected to the first switch interface S1, and the first switch circuit 110 is connected to the second switch circuit 120. In this case, the first switch circuit 110 and the second switch circuit 120 output a same level state. Under a condition that one of the first switch circuit and the second switch circuit is the active switch circuit, both the first switch circuit and the second switch circuit output the first level state. Under a condition that both the first switch circuit and the second switch circuit are the passive switch circuits, both the first switch circuit and the second switch circuit output the second level state.

According to the recognition apparatus for the topology provided in these embodiments, the pull-up circuit, the pull-down circuit, the active switch circuit, and the passive switch circuit are used, whereby level states of the switch circuit in different topology modes may be changed conveniently. In addition, in these embodiments, a logical relationship between the circuits is easy to implement, whereby the current topology mode may be recognized based on simple circuits.

In some implementations, as shown in FIG. 6, the active switch circuit includes a first transistor Q1, a first voltage divider resistor R11, and a first current limiting resistor R12. In FIG. 6, an example in which the second switch circuit 120 is an active switch circuit is used.

One end of the first voltage divider resistor R11 is connected to the power supply, and the other end is connected to a control end of the first transistor Q1. One end of the first current limiting resistor R12 is connected to the power supply, and the other end is connected to a first end of the first transistor Q1. A second end of the first transistor Q1 is grounded. The control end of the first transistor Q1 controls whether the first end and the second end of the first transistor Q1 are conducted, and is configured to be connected to an interface of a switch. The first end of the first transistor Q1 is configured to output a level state.

In these embodiments, the first transistor Q1 is a type of transistor with three ends, where one end is a control end configured to control whether the transistor is conducted, and the other two ends are connected to a circuit loop, to change an operating state of the circuit loop. For example, the first transistor Q1 may be a triode or a field effect transistor (MOS). Under a condition that the first transistor Q1 is the triode, a base of the triode is the control end of the transistor, and a collector and an emitter of the triode are the first end and the second end of the transistor. Under a condition that the first transistor Q1 is the field effect transistor, a gate of the field effect transistor is the control end of the transistor, and a source and a drain of the field effect transistor are the first end and the second end of the transistor. As shown in FIG. 6, the first transistor Q1 is an N-channel metal oxide semiconductor (NMOS), a drain of the first transistor is connected to the first current limiting resistor R12, and a source is grounded.

In addition, the control end of the first transistor Q1 may be connected to the interface of the switch. In other words, the active switch circuit is connected to an interface of a switch. This means that the control end of the first transistor Q1 of the active switch circuit is connected to the interface of the switch. As shown in FIG. 6, the second switch circuit 120 is an active switch circuit, and the second switch circuit 120 may be connected to the first switch interface S1 by connecting a control end of a first transistor Q1 of the second switch circuit to the first switch interface S1.

In these embodiments, the control end of the first transistor Q1 is connected to the interface of the switch, for example, the cascade interface S5, the first switch interface S1 and the like. Under a condition that When the interface of the switch is connected to another interface, a magnitude of a voltage at the control end of the first transistor Q1 may be changed, whereby the first transistor Q1 is conduced or cut off. The first voltage divider resistor R11 connected to the control end of the first transistor Q1 may have a voltage division function. In this way, the voltage at the control end has different magnitudes under a condition that the control end of the first transistor Q1 is connected to different circuits (for example, a pull-up circuit or a pull-down circuit), whereby the first transistor Q1 is conducted or cut off.

The first current limiting resistor R12 may have a protection function, whereby the active switch circuit may output a level state normally. As shown in FIG. 6, under a condition that the first transistor Q1 is conducted, under the action of the first current limiting resistor R12, the first end of the first transistor Q1 is grounded, and the level state output by the first end is a low level. Under a condition that the first transistor Q1 is cut off, the first current limiting resistor R12 is equivalent to a pull-up resistor, and may pull up a voltage at the first end of the first transistor Q1, whereby the level state output by the first tend of the first transistor Q1 is a high level.

In these embodiments, an active switch circuit of a simple structure may be constructed based on the first transistor Q1, the first voltage divider resistor R11, and the first current limiting resistor R12, whereby it is ensured that the recognition apparatus is simple in overall structure and easy to implement.

In some embodiments, under a condition that the active switch circuit is connected to the pull-up circuit, the first transistor Q1 may be conducted. Correspondingly, under a condition that the active switch circuit is connected to the pull-down circuit, the first transistor Q1 needs to be cut off, that is, the voltage at the control end of the first transistor Q1 needs to be less than an on voltage $Vth_1$ of the first transistor Q1. In some embodiments, the pull-down circuit includes a grounded pull-down resistor. Resistance of the first voltage divider resistor R11 and resistance of the pull-down resistor satisfy:

$$VCC_1 \times R_{down}/(R_{down}+R_{11}) < Vth_1,$$

where $VCC_1$ represents a voltage value of the power supply to which the first voltage divider resistor R11 is connected, $R_{11}$ represents the resistance of the first voltage divider resistor R11, $R_{down}$ represents the resistance of the pull-down resistor, and $Vth_1$ represents the on voltage of the first transistor Q1.

In these embodiments, under a condition that when the active switch circuit is connected to the pull-down circuit, the first voltage divider resistor R11 of the active switch circuit and the pull-down resistor of the pull-down circuit form a voltage division circuit, and a voltage between the first voltage divider resistor and the pull-down resistor is the voltage at the control end of the first transistor Q1, where the voltage is $VCC_1 \times R_{down}/(R_{down}+R_{11})$. Resistors with proper resistance are selected as the first voltage divider resistor R11 and the pull-down resistor, whereby the voltage at the control end may be less than the on voltage $Vth_1$ of the first transistor Q1. For example, a power voltage connected to the first voltage divider resistor R11 is 3.3 V, that is, $VCC_1=3.3$ V, and it is set that the resistance of the first voltage divider resistor R11 is 1000 Ohms and the resistance of the pull-down resistor is 100 Ohms. In this case, under a condition that the active switch circuit is connected to the pull-down circuit, the voltage at the control end of the first transistor Q1 is approximately 0.3 V, less than the on voltage $Vth_1$ of the first transistor Q1 (for example, the on voltage $Vth_1$ is generally not less than 0.7 V), whereby a requirement may be met.

In some implementations, as shown in FIG. 6, the passive switch circuit includes a second transistor Q2, a second voltage divider resistor R21, and a second current limiting resistor R22. In FIG. 6, an example in which the first switch circuit 110 is a passive switch circuit is used.

One end of the second voltage divider resistor R21 is connected to a control end of the second transistor Q2, and the other end is grounded. One end of the second current limiting resistor R22 is connected to a power supply, and the other end is connected to a first end of the second transistor Q2. A second end of the second transistor Q2 is grounded. The control end of the second transistor Q2 controls whether the first end and the second end of the second transistor Q2 are conducted, and is configured to be connected to an interface of a switch. The first end of the second transistor Q2 is configured to output a level state.

In these embodiments, the second transistor Q2 is similar to the first transistor Q1. The second transistor Q2 may be a triode or a field effect transistor (MOS). Under a condition that the second transistor Q2 is the triode, a base of the triode is the control end of the transistor, and a collector and an emitter of the triode are the first end and the second end of the transistor. Under a condition that the second transistor Q2 is the field effect transistor, a gate of the field effect transistor is the control end of the transistor, and a source and a drain of the field effect transistor are the first end and the second end of the transistor. In order to ensure that the active switch circuit and the passive switch circuit output the same level state under a condition that the active switch circuit is connected to the passive switch circuit, the first transistor Q1 and the second transistor Q2 may be transistors of a same type, that is, both the first transistor and the second transistor are triodes or field effect transistors.

In addition, the control end of the second transistor Q2 may be connected to the interface of the switch. In other words, the passive switch circuit is connected to an interface of a switch. This means that the control end of the second transistor Q2 of the passive switch circuit is connected to the interface of the switch. As shown in FIG. 6, the first switch circuit 110 is a passive switch circuit, and the first switch circuit 110 may be connected to the cascade interface S5 by connecting a control end of a second transistor Q2 of the first switch circuit to the cascade interface S5.

In these embodiments, the control end of the second transistor Q2 is connected to the interface of the switch, for example, the cascade interface S5, the first switch interface S1 and the like. Under a condition that the interface of the switch is connected to another interface, a magnitude of a voltage at the control end of the second transistor Q2 may be changed, whereby the second transistor Q2 is conduced or cut off. The second voltage divider resistor R21 connected to the control end of the second transistor Q2 may have a voltage division function. In this way, the voltage at the control end has different magnitudes under a condition that the control end of the second transistor Q2 is connected to different circuits (for example, a pull-up circuit or a pull-down circuit), whereby the second transistor Q2 is conducted or cut off.

In addition, a working principle of the second current limiting resistor R22 is similar to that of the first current limiting resistor R12. Details are not described herein.

In these embodiments, a passive switch circuit of a simple structure may be constructed based on the second transistor Q2, the second voltage divider resistor R21, and the second current limiting resistor R22, whereby it is ensured that the recognition apparatus is simple in overall structure and easy to implement.

In some embodiments, under a condition that the passive switch circuit is connected to the pull-down circuit, the control end of the second transistor Q2 is not connected to the power supply, whereby the second transistor Q2 is cut off. Correspondingly, under a condition that the passive switch circuit is connected to the pull-up circuit, the second transistor Q2 needs to be conducted, that is, the voltage at the control end of the second transistor Q2 needs to be greater than an on voltage $Vth_2$ of the second transistor Q2. In some embodiments, the pull-up circuit includes a pull-up resistor connected to the power supply. Resistance of the second voltage divider resistor R21 and resistance of the pull-up resistor satisfy:

$$VCC_2 \times R_{21}/(R_{up}+R_{21}) > Vth_2,$$

$VCC_2$ represents a voltage value of the power supply to which the pull-up resistor is connected, $R_{21}$ represents the resistance of the second voltage divider resistor R21, $R_{up}$ represents the resistance of the pull-up resistor, and $Vth_2$ represents the on voltage of the second transistor Q2.

In these embodiments, when the passive switch circuit is connected to the pull-up circuit, the pull-up resistor of the pull-up circuit and the second voltage divider resistor R21 of the passive switch circuit form a voltage division circuit, and a voltage between the pull-up resistor and the second voltage divider resistor is the voltage at the control end of the second transistor Q2, where the voltage is $VCC_2 \times R_{21}/(R_{up}+R_{21})$. Resistors with proper resistance are selected as the second voltage divider resistor R21 and the pull-up resistor, whereby the voltage at the control end may be greater than the on voltage $Vth_2$ of the second transistor Q2. For example, a power voltage connected to the pull-up resistor is 3.3 V, that is, $VCC_2=3.3$ V, and it is set that both the resistance of the second voltage divider resistor R21 and the resistance of the pull-up resistor are 1000 Ohms. In this case, when the passive switch circuit is connected to the pull-up circuit, the voltage at the control end of the second transistor Q2 is approximately 1.65V, which may be greater than the on voltage $Vth_2$ of the second transistor Q2, whereby a requirement may be met.

In addition, in order to ensure that both the first transistor Q1 and the second transistor Q2 are conducted under a condition that the active switch circuit is connected to the passive switch circuit, the first voltage divider resistor R11 and the second voltage divider resistor R21 that have proper resistance may be disposed. For example, the resistance of the first voltage divider resistor R11 is the same as the resistance of the second voltage divider resistor R21, or the resistance of the first voltage divider resistor R11 is less than the resistance of the second voltage divider resistor R21.

Figure 7:
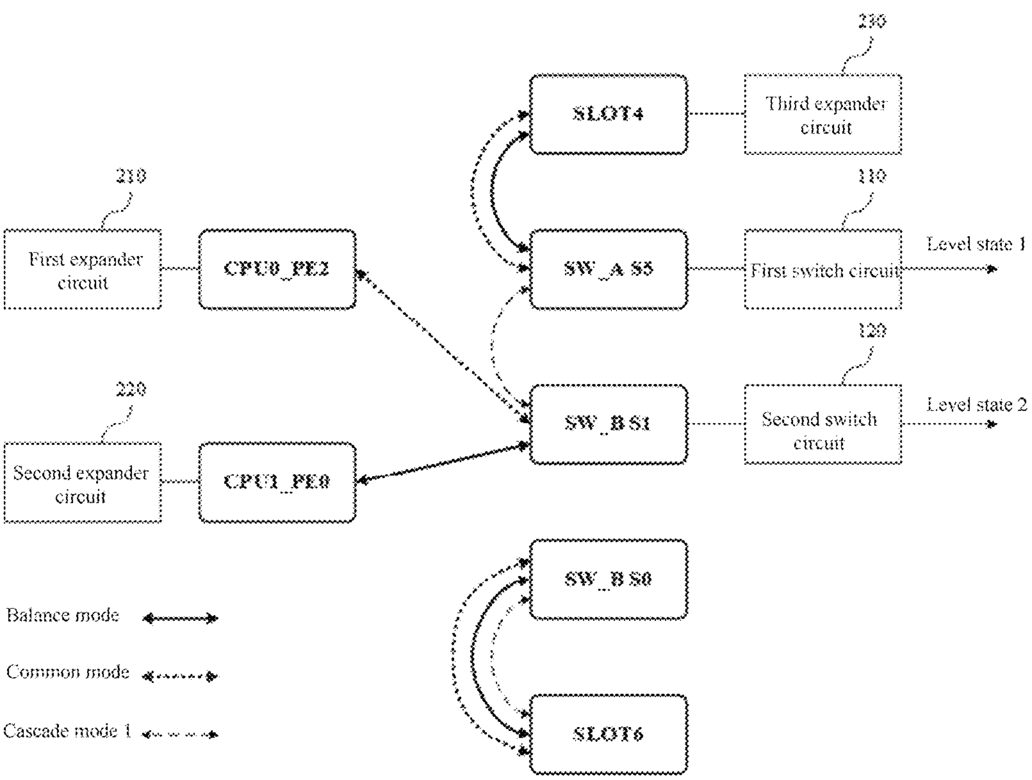
FIG. 7 is a schematic structural diagram of the recognition apparatus for the topology according to some embodiments of the present application.

According to some embodiments of the present application, some embodiments of the recognition apparatus for the topology is provided. FIG. 7 is a schematic structural diagram of the recognition apparatus for the topology according to some embodiments of the present application. As shown in FIG. 7, the recognition apparatus for the topology includes a first switch circuit 110, a second switch circuit 120, a first expander circuit 210, and a second expander circuit 220. In addition, the recognition apparatus further includes a third expander circuit 230.

As shown in FIG. 7, the third expander circuit (230) is configured to be connected to a first slot SLOT4. The first slot SLOT4 is connected to a first switch SW_A. In a balance mode or a common mode, a cascade interface S5 is connected to the first slot SLOT4. In addition, the first switch circuit 110 outputs different level states under a condition that the first switch circuit 110 is connected to the second switch circuit 120 and under a condition that the first switch circuit 110 is connected to the third expander circuit 230.

In order to improve utilization of a PCIe interface of a switch as much as possible, the PCIe interface of the switch is usually not idle. For example, as shown in FIG. 7, in the balance mode or the common mode, the cascade interface S5 may be connected to the first slot SLOT4 connected to a first switch SW_A. In the cascade mode, the cascade interface S5 is not connected to the first slot SLOT4 but connected to a switch interface of a second switch SW_B, for example, connected to a first switch interface S1. In these embodiments, the third expander circuit 230 is disposed for the first slot SLOT4, whereby in the balance mode or the common mode, the first switch circuit 110 may be connected to the third expander circuit 230, and the first switch circuit 110 may output a proper level state.

In some embodiments, in a cascade mode, the cascade interface S5 may be connected to the first switch interface S1. In other words, the cascade mode is the foregoing cascade mode 1. In this case, the first switch circuit 110 outputs different level states under a condition that the first switch circuit 110 is connected to the second switch circuit 120 and under a condition that the first switch circuit 110 is connected to the third expander circuit 230. In some embodiments, the first switch circuit 110 outputs one level state under a condition that the first switch circuit 110 is connected to the second switch circuit 120, or the first switch circuit 110 outputs another level state under a condition that the first switch circuit 110 is connected to the third expander circuit 230.

As shown in FIG. 7, in the cascade mode 1, the cascade interface S5 is connected to the first switch interface S1, that is, the first switch circuit 110 is connected to the second switch circuit 120. In the balance mode or the common mode, the cascade interface S5 is connected to the first slot SLOT4. The first switch circuit 110 outputs different level states in the two cases. Therefore, whether a current topology mode is the cascade mode may be determined based on a level state output by the first switch circuit 110.

In these embodiments, the third expander circuit 230 is disposed for the first slot SLOT4, whereby the first switch circuit 110 conveniently outputs different level states in different modes, to determine whether a current topology mode is the cascade mode.

In some implementations, the first switch circuit 110 and the second switch circuit 120 may be active switch circuits or passive switch circuits. There is a total of four case. In each case, the topology mode may be recognized by selecting a proper third expander circuit 230.

In a first case, the third expander circuit 230 is a pull-down circuit under a condition that the first switch circuit 110 is a passive switch circuit and the second switch circuit 120 is an active switch circuit.

In some embodiments, as shown in FIG. 6, in the balance mode or the common mode, the cascade interface S5 is connected to the first slot SLOT4, that is, the first switch circuit 110 is connected to the third expander circuit 230, that is, the passive switch circuit is connected to the pull-down circuit, and the first switch circuit 110 outputs a second level state. The structure shown in FIG. 6 is used as an example. A second transistor Q2 is cut off, and the first switch circuit 110 outputs a high level, that is, a level state 1 is a high level.

In the cascade mode 1, the first switch circuit 110 is connected to the second switch circuit 120, that is, the passive switch circuit is connected to the active switch circuit, and both the first switch circuit 110 and the second switch circuit 120 output a first level state. The structure shown in FIG. 6 is used as an example. The second transistor Q2 is cut off, and the first switch circuit 110 outputs a low level, that is, the level state 1 is a low level. Therefore, whether a current topology uses the cascade mode 1 may be determined based on a level state output by the first switch circuit 110.

In a second case, the third expander circuit 230 is a pull-down circuit under a condition that the first switch circuit 110 is an active switch circuit and the second switch circuit 120 is a passive switch circuit.

In some embodiments, in the balance mode or the common mode, the cascade interface S5 is connected to the first slot SLOT4, that is, the first switch circuit 110 is connected to the third expander circuit 230, that is, the active switch circuit is connected to the pull-down circuit, and the first switch circuit 110 outputs a second level state. For example, the first switch circuit 110 outputs a high level if structures of the active switch circuit and the passive switch circuit are as shown in FIG. 6.

In the cascade mode 1, the first switch circuit 110 is connected to the second switch circuit 120, that is, the passive switch circuit is connected to the active switch circuit, and both the first switch circuit 110 and the second switch circuit 120 output a first level state. For example, the first switch circuit 110 outputs a low level if structures of the active switch circuit and the passive switch circuit are as shown in FIG. 6. Therefore, whether a current topology uses the cascade mode 1 may be determined based on a level state output by the first switch circuit 110.

In a third case, the third expander circuit 230 is a pull-down circuit under a condition that both the first switch circuit 110 and the second switch circuit 120 are active switch circuits.

In some embodiments, in the balance mode or the common mode, the cascade interface S5 is connected to the first slot SLOT4, that is, the first switch circuit 110 is connected to the third expander circuit 230, that is, the active switch circuit is connected to the pull-down circuit, and the first switch circuit 110 outputs a second level state. For example, the first switch circuit 110 outputs a high level if structures of the active switch circuits are as shown in FIG. 6.

In the cascade mode 1, the first switch circuit 110 is connected to the second switch circuit 120, that is, the active switch circuits are connected to each other, and both the first switch circuit 110 and the second switch circuit 120 output a first level state. For example, the first switch circuit 110 outputs a low level if structures of the active switch circuits are as shown in FIG. 6. Therefore, whether a current topology uses the cascade mode 1 may be determined based on a level state output by the first switch circuit 110.

In a fourth case, the third expander circuit 230 is a pull-up circuit under a condition that both the first switch circuit 110 and the second switch circuit 120 are passive switch circuits.

Figure 8:
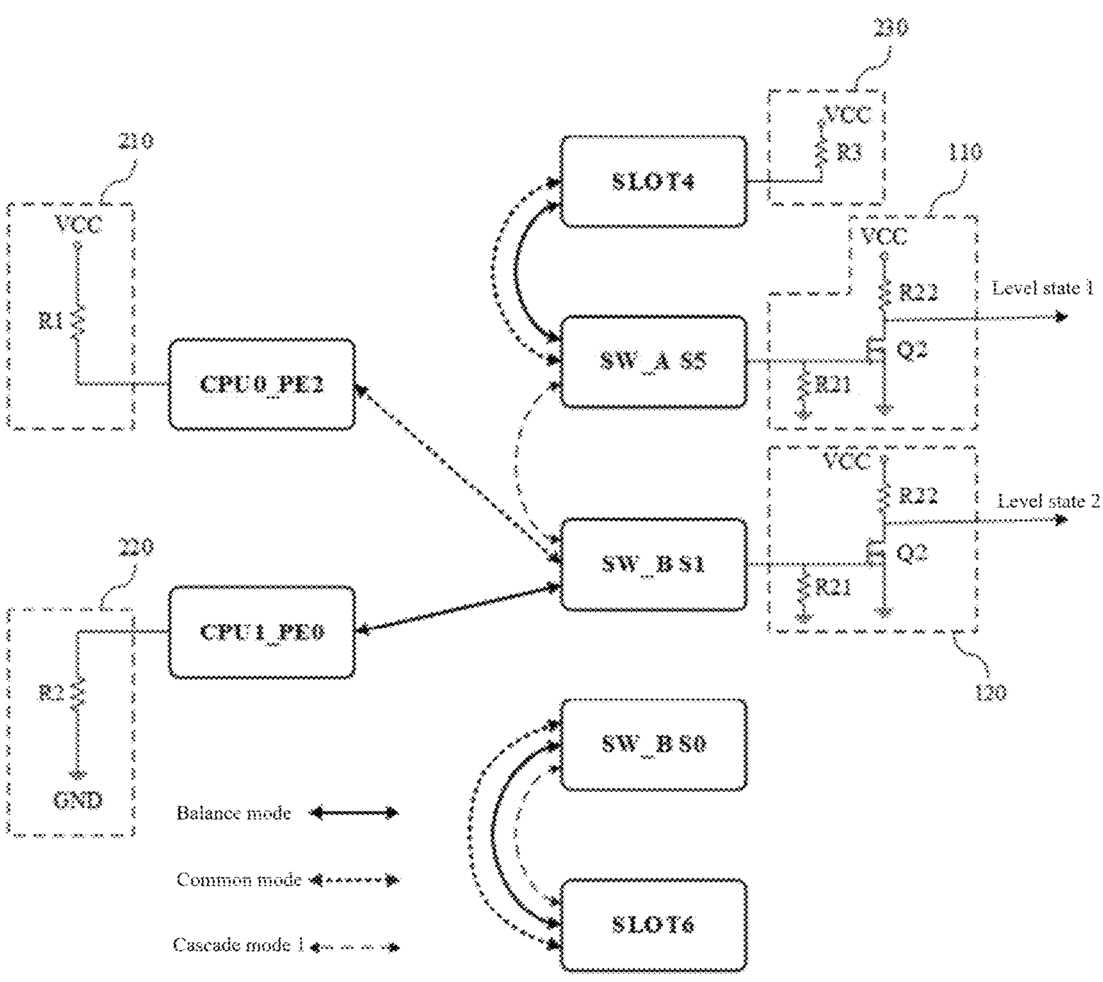
FIG. 8 is a schematic structural diagram of another topological recognition apparatus according to some embodiments of the present application.

In some embodiments, as shown in FIG. 8, in the balance mode or the common mode, the cascade interface S5 is connected to the first slot SLOT4, that is, the first switch circuit 110 is connected to the third expander circuit 230, that is, the passive switch circuit is connected to the pull-up circuit, and the first switch circuit 110 outputs a first level state. The structure shown in FIG. 8 is used as an example. The second transistor Q2 is cut off, and the first switch circuit 110 outputs a low level, that is, the level state 1 is a low level.

In the cascade mode 1, the first switch circuit 110 is connected to the second switch circuit 120, that is, the passive switch circuit is connected to the passive switch circuit, and both the first switch circuit 110 and the second switch circuit 120 output a second level state. The structure shown in FIG. 8 is used as an example. The second transistor Q2 is cut off, and the first switch circuit 110 outputs a high level, that is, the level state 1 is a high level. Therefore, whether a current topology uses the cascade mode 1 may be determined based on a level state output by the first switch circuit 110.

In FIG. 6 and FIG. 8, an example in which the first expander circuit 210 is a pull-up circuit and the second expander circuit 220 is a pull-down circuit is used. Under a condition that the first expander circuit 210 is a pull-down circuit, and the second expander circuit 220 is a pull-up circuit, a level state output by the second switch circuit 120 in the balance mode or the common mode may be affected. However, in the balance mode or the common mode, the second switch circuit 120 may still output different level states, that is, the balance mode or the common mode may still be recognized. This is not described in detail in these embodiments.

In these embodiments, during switching to the cascade mode, the cascade interface S5 of the first switch SW_A is switched to the first switch interface S1 of the second switch SW_B. In other words, in the cascade mode 1, the cascade interface S5 is connected to the first switch interface S1. In this case, based on level states output by the two switch circuits, that is, the level state 1 output by the first switch circuit 110 and the level state 2 output by the second switch circuit 120, the current topology mode may be determined conveniently, that is, whether the current topology mode is the balance mode, the common mode, or the cascade mode 1 may be determined.

Figure 9:
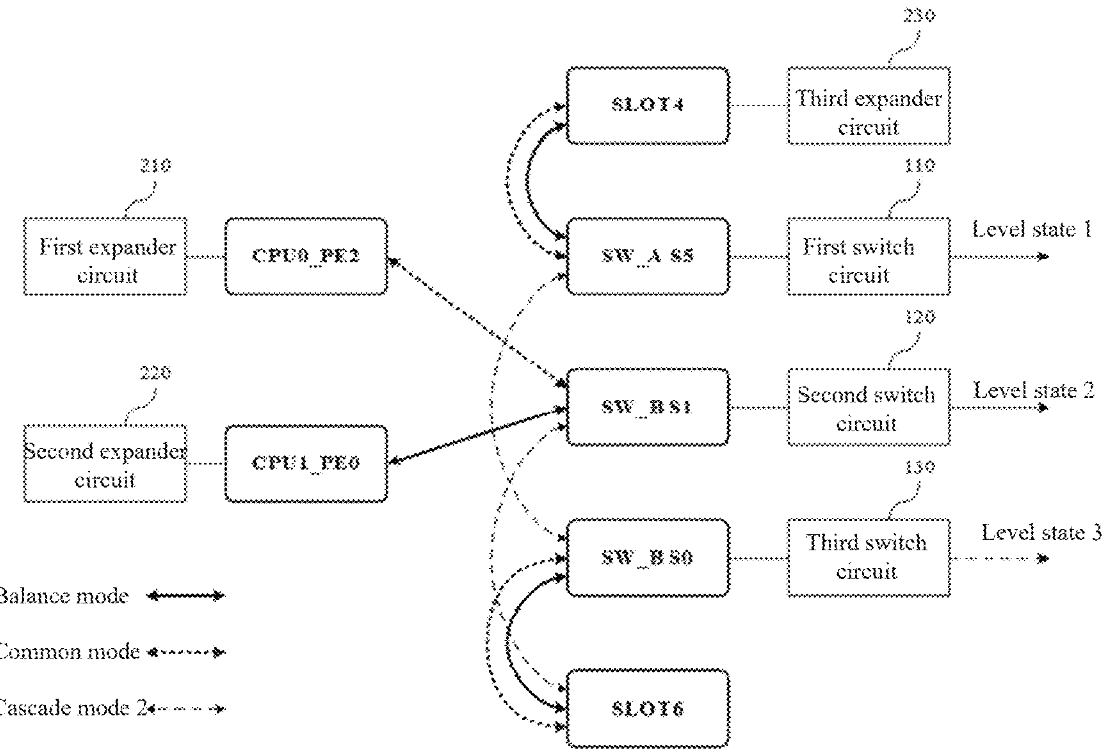
FIG. 9 is a schematic structural diagram of the recognition apparatus for the topology according to some embodiments of the present application.

According to some embodiments of the present application, some embodiments of the recognition apparatus for the topology is provided. FIG. 9 is a schematic structural diagram of the recognition apparatus for the topology according to some embodiments of the present application. As shown in FIG. 9, the recognition apparatus for the topology includes a first switch circuit 110, a second switch circuit 120, a first expander circuit 210, and a second expander circuit 220. In addition, the recognition apparatus further includes a third expander circuit 230 and a third switch circuit 130.

As shown in FIG. 9, the third expander circuit (230) is configured to be connected to a first slot SLOT4. The first slot SLOT4 is connected to a first switch SW_A. In a balance mode or a common mode, a cascade interface S5 is connected to the first slot SLOT4. The third switch circuit 130 is configured to be connected to a second switch interface S0 of a second switch SW_B. In a cascade mode, the cascade interface S5 is connected to a second switch interface S0, that is, the first switch circuit 110 is connected to the third switch circuit 130. The cascade mode is the foregoing cascade mode 2. In addition, the first switch circuit 110 outputs different level states under a condition that the first switch circuit 110 is connected to the third switch circuit 130 and under a condition that the first switch circuit 110 is connected to the third expander circuit 230.

In order to improve utilization of a PCIe interface of a switch as much as possible, the PCIe interface of the switch is usually not idle. For example, as shown in FIG. 9, in the balance mode or the common mode, the cascade interface S5 may be connected to the first slot SLOT4 connected to the first switch SW_A. In the cascade mode 2, the cascade interface S5 is not connected to the first slot SLOT4 but connected to a switch interface of the second switch SW_B, for example, connected to the second switch interface S0. In these embodiments, the third expander circuit 230 is disposed for the first slot SLOT4, whereby in the balance mode or the common mode, the first switch circuit 110 may be connected to the third expander circuit 230, and the first switch circuit 110 may output a proper level state.

In some embodiments, in the cascade mode 2, the cascade interface S5 may be connected to the second switch interface S0. The first switch circuit 110 outputs different level states under a condition that the first switch circuit 110 is connected to the third switch circuit 130 and under a condition that the first switch circuit 110 is connected to the third expander circuit 230. In some embodiments, the first switch circuit 110 outputs one level state under a condition that the first switch circuit 110 is connected to the third switch circuit 130, or the first switch circuit 110 outputs another level state under a condition that the first switch circuit 110 is connected to the third expander circuit 230.

As shown in FIG. 9, in the cascade mode 2, the cascade interface S5 is connected to the second switch interface S0, that is, the first switch circuit 110 is connected to the third switch circuit 130. In the balance mode or the common mode, the cascade interface S5 is connected to the first slot SLOT4. The first switch circuit 110 outputs different level states in the two cases. Therefore, whether a current topology mode is the cascade mode 2 may be determined based on a level state output by the first switch circuit 110.

In these embodiments, the third expander circuit 230 is disposed for the first slot SLOT4, whereby the first switch circuit 110 conveniently outputs different level states in different modes, to determine whether a current topology mode is the cascade mode 2.

In some implementations, one of the first expander circuit 210 and the second expander circuit 220 that may be connected to the second switch circuit 120 is a pull-up circuit, and the other is a pull-down circuit. Therefore, no matter whether the second switch circuit 120 is an active switch circuit or a passive switch circuit, the level state output by the second switch circuit 120 may be used to distinguish the balance mode and the common mode. In addition, the first switch circuit 110 and the third switch circuit 130 may be active switch circuits or passive switch circuits. There is a total of four case. In each case, the topology mode may be recognized by selecting a proper third expander circuit 230.

In a first case, the third expander circuit 230 is a pull-down circuit under a condition that the first switch circuit 110 is a passive switch circuit and the third switch circuit 130 is an active switch circuit.

Figure 10:
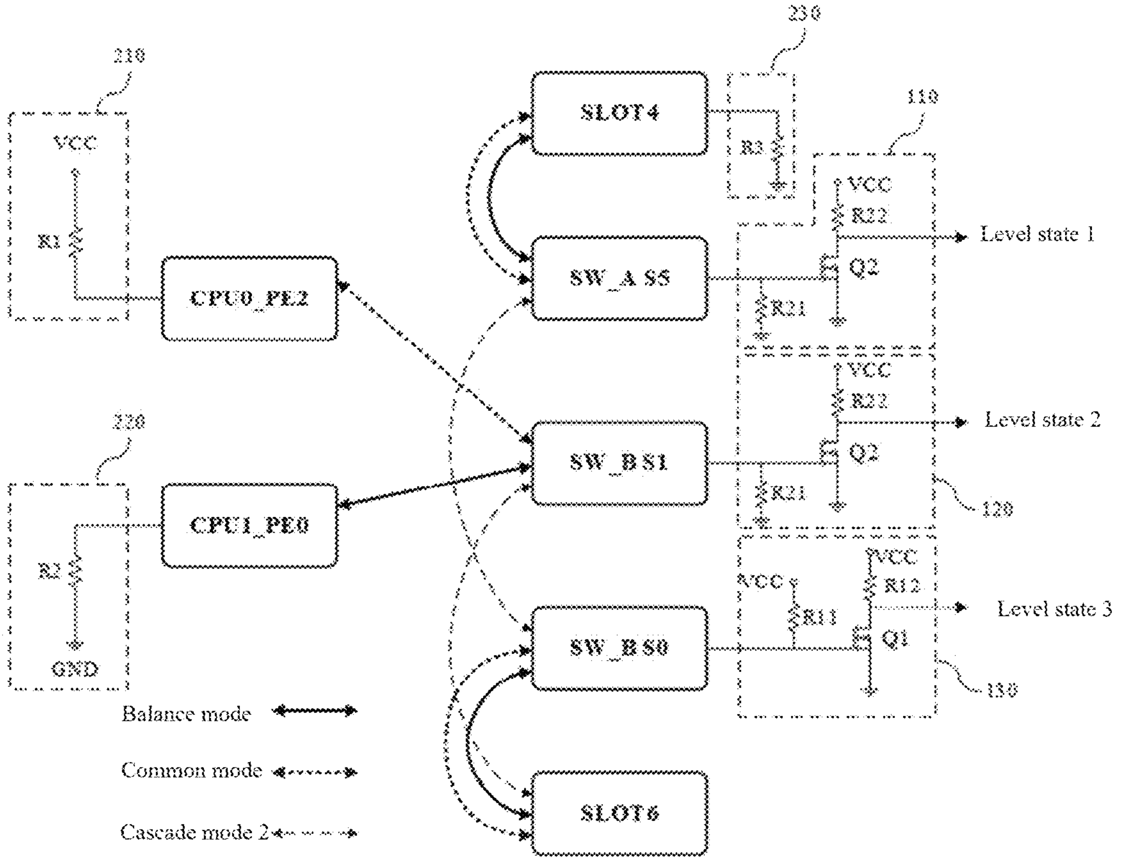
FIG. 10 is a schematic structural diagram of another recognition apparatus for the topology according to some embodiments of the present application.

In some embodiments, as shown in FIG. 10, in the balance mode or the common mode, the cascade interface S5 is connected to the first slot SLOT4, that is, the first switch circuit 110 is connected to the third expander circuit 230, that is, the passive switch circuit is connected to the pull-down circuit, and the first switch circuit 110 outputs a second level state. The structure shown in FIG. 10 is used as an example. A second transistor Q2 is cut off, and the first switch circuit 110 outputs a high level, that is, a level state 1 is a high level.

In the cascade mode 2, the first switch circuit 110 is connected to the third switch circuit 130, that is, the passive switch circuit is connected to the active switch circuit, and both the first switch circuit 110 and the third switch circuit 130 output a first level state. The structure shown in FIG. 10 is used as an example. The second transistor Q2 is turned on, and the first switch circuit 110 outputs a low level, that is, the level state 1 is a low level. Therefore, whether the current topology uses the cascade mode 2 may be determined based on a level state output by the first switch circuit 110.

In a second case, the third expander circuit 230 is a pull-down circuit when the first switch circuit 110 is an active switch circuit and the third switch circuit 130 is a passive switch circuit.

In some embodiments, in the balance mode or the common mode, the cascade interface S5 is connected to the first slot SLOT4, that is, the first switch circuit 110 is connected to the third expander circuit 230, that is, the active switch circuit is connected to the pull-down circuit, and the first switch circuit 110 outputs a second level state. For example, the first switch circuit 110 outputs a high level if structures of the active switch circuit and the passive switch circuit are as shown in FIG. 10.

In the cascade mode 2, the first switch circuit 110 is connected to the third switch circuit 130, that is, the passive switch circuit is connected to the active switch circuit, and both the first switch circuit 110 and the third switch circuit 130 output a first level state. For example, the first switch circuit 110 outputs a low level if structures of the active switch circuit and the passive switch circuit are as shown in FIG. 10. Therefore, whether the current topology uses the cascade mode 2 may be determined based on a level state output by the first switch circuit 110.

In a third case, the third expander circuit 230 is a pull-down circuit when both the first switch circuit 110 and the third switch circuit 130 are active switch circuits.

In some embodiments, in the balance mode or the common mode, the cascade interface S5 is connected to the first slot SLOT4, that is, the first switch circuit 110 is connected to the third expander circuit 230, that is, the active switch circuit is connected to the pull-down circuit, and the first switch circuit 110 outputs a second level state. For example, the first switch circuit 110 outputs a high level if structures of the active switch circuits are as shown in FIG. 10.

In the cascade mode 2, the first switch circuit 110 is connected to the third switch circuit 130, that is, the active switch circuits are connected to each other, and both the first switch circuit 110 and the third switch circuit 130 output a first level state. For example, the first switch circuit 110 outputs a low level if structures of the active switch circuits are as shown in FIG. 10. Therefore, whether the current topology uses the cascade mode 2 may be determined based on a level state output by the first switch circuit 110.

In a fourth case, the third expander circuit 230 is a pull-up circuit when both the first switch circuit 110 and the third switch circuit 130 are passive switch circuits.

Figure 11:
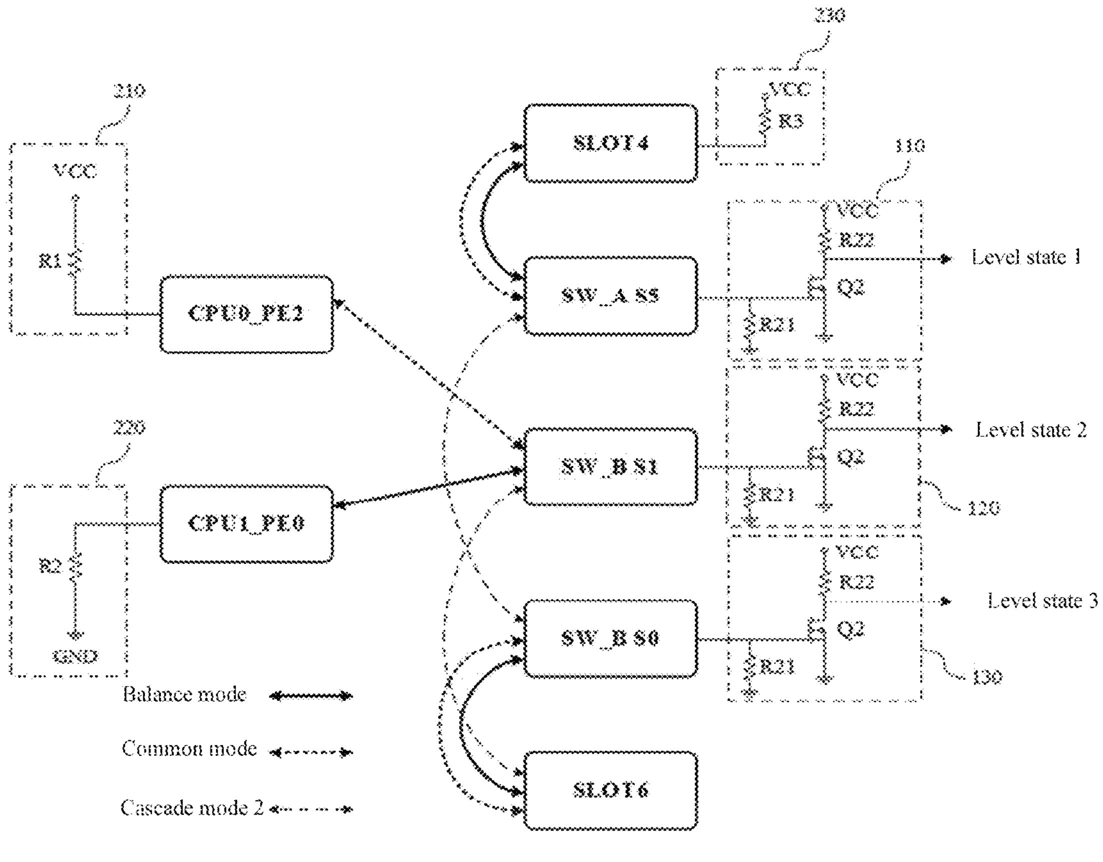
FIG. 11 is a schematic structural diagram of still another recognition apparatus for the topology according to some embodiments of the present application.

In some embodiments, as shown in FIG. 11, in the balance mode or the common mode, the cascade interface S5 is connected to the first slot SLOT4, that is, the first switch circuit 110 is connected to the third expander circuit 230, that is, the passive switch circuit is connected to the pull-up circuit, and the first switch circuit 110 outputs a first level state. The structure shown in FIG. 11 is used as an example. A second transistor Q2 is cut off, and the first switch circuit 110 outputs a low level, that is, a level state 1 is a low level.

In the cascade mode 2, the first switch circuit 110 is connected to the third switch circuit 130, that is, the passive switch circuits are connected to each other, and both the first switch circuit 110 and the third switch circuit 130 output a second level state. The structure shown in FIG. 11 is used as an example. A second transistor Q2 is cut off, and the first switch circuit 110 outputs a high level, that is, a level state 1 is a high level. Therefore, whether the current topology uses the cascade mode 2 may be determined based on a level state output by the first switch circuit 110.

In FIG. 10 and FIG. 11, the second switch circuit 120 is a passive switch circuit, the first expander circuit 210 is a pull-up circuit, and the second expander circuit 220 is a pull-down circuit. Under a condition that the first expander circuit 210 is a pull-down circuit, and the second expander circuit 220 is a pull-up circuit, a level state output by the second switch circuit 120 in the balance mode or the common mode may be affected. However, in the balance mode or the common mode, the second switch circuit 120 may still output different level states, that is, the balance mode or the common mode may still be recognized. This is not described in detail in these embodiments.

In these embodiments, during switching to the cascade mode, the cascade interface S5 of the first switch SW_A is switched to the second switch interface S0 of the second switch SW_B. In other words, in the cascade mode 2, the cascade interface S5 is connected to the second switch interface S0. In this case, based on level states output by the two switch circuits, that is, the level state 1 output by the first switch circuit 110 and the level state 2 output by the second switch circuit 120, the current topology mode may be determined conveniently, that is, whether the current topology mode is the balance mode, the common mode, or the cascade mode 2 may be determined.

Figure 12:
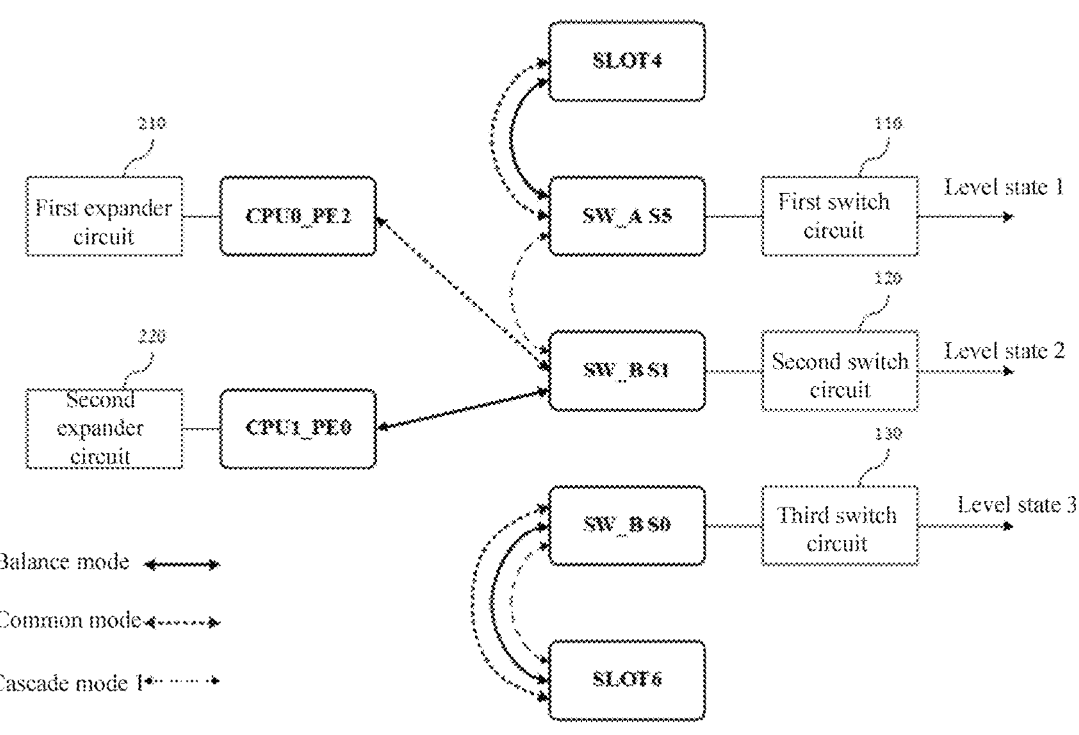
FIG. 12 is a schematic diagram of a connection manner for the recognition apparatus for the topology according to some embodiments of the present application.

It should be noted that when the current topology mode needs to be recognized, although the three switch circuits may output corresponding level states, whether the current topology mode is the balance mode, the common mode, or the cascade mode 2 may be recognized by using the level states of two switch circuits. Therefore, no attention may be paid to a level state 3 output by the third switch circuit 130. In addition, it may be understood that in these embodiments, transistors, resistors, and the like in active switch circuits (or passive switch circuits) are represented by using unified reference signs, but different switch circuits may use transistors of a same specification and resistors of a same specification, or may use transistors whose specifications are not totally the same and resistors whose specifications are not totally the same. This is not limited in these embodiments. As shown in FIG. 12, both the first switch circuit 110 and the second switch circuit 120 are passive switch circuits, and both have a second voltage divider resistor R21. Resistance of the second voltage divider resistor R21 in the first switch circuit 110 may be the same as or different from resistance of the voltage divider resistor R21 in the second switch circuit 120, which may be determined based on an actual situation.

In order to determine which mode among the balance mode in FIG. 1, the common mode in FIG. 2, the cascade mode 1 in FIG. 3, or the cascade mode 2 in FIG. 4 corresponds to the current topology, the recognition apparatus for the topology provided in these embodiments of the present application is further provided with the third switch circuit. The circuits are matched with each other, or more level states are introduced, whereby the balance mode, the common mode, and the cascade mode may be distinguished under a condition that a user may use the cascade mode 1 and the cascade mode 2.

Figure 13:
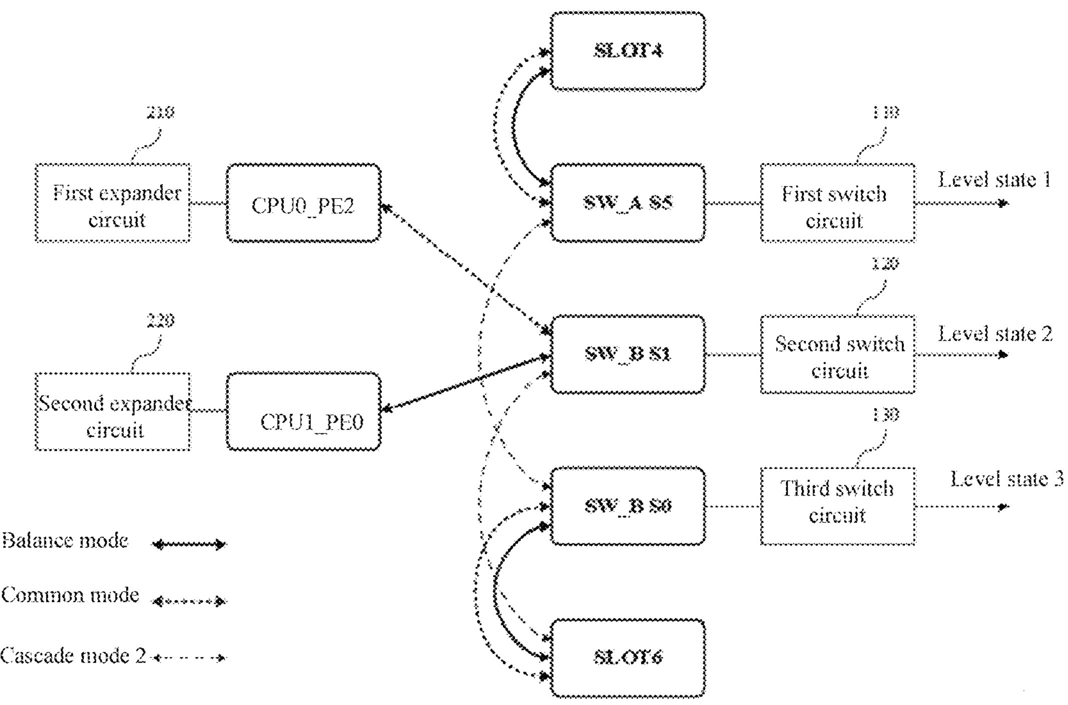
FIG. 13 is a schematic diagram of another connection manner for the recognition apparatus for the topology according to some embodiments of the present application.

According to some embodiments of the present application, some embodiments of the recognition apparatus for the topology is provided. FIG. 12 and FIG. 13 are schematic diagrams of a structure of the recognition apparatus for the topology according to some embodiments of the present application. As shown in FIG. 12 and FIG. 13, the recognition apparatus for the topology includes a first switch circuit 110, a second switch circuit 120, a first expander circuit 210, and a second expander circuit 220. In addition, the recognition apparatus further includes a third switch circuit 130. FIG. 12 shows connection manners in a balance mode, a common mode, and a cascade mode 1. FIG. 13 shows connection manners in the balance mode, the common mode, and a cascade mode 2. It may be understood that the connection manners for both the balance mode and the common mode in FIG. 12 and FIG. 13 are the same.

The third switch circuit 130 is configured to be connected to a second switch interface S0 of a second switch SW_B. In a cascade mode, a cascade interface S5 is connected to a first switch interface S1 or the second switch interface S0. As shown in FIG. 12, the cascade interface S5 is connected to the first switch interface S1. In some embodiments, as shown in FIG. 13, the cascade interface S5 is connected to the second switch interface S0.

Three level states output by the first switch circuit 110, the second switch circuit 120, and the third switch circuit 130 under a condition that the cascade interface S5 is connected to the first switch interface S1 or the second switch interface S0 are not totally the same as three level states output by the first switch circuit 110, the second switch circuit 120, and the third switch circuit 130 in the balance mode or the common mode.

In these embodiments, the first switch circuit 110, the second switch circuit 120, and the third switch circuit 130 may output three level states, that is, a level state 1, a level state 2, and a level state 3, and a mode for a current topology may be determined based on the three level states. The three level states output are not totally the same in different modes, that is, in the balance mode, the common mode, the cascade mode 1, and the cascade mode 2. Therefore, the four topology modes may be distinguished, and the current topology mode may be correctly recognized no matter whether the cascade interface S5 is connected to the first switch interface S1 for cascading or is connected to the second switch interface S0 for cascading.

In some implementations, the first switch circuit 110 outputs a same level state under a condition that the first switch circuit 110 is connected to the second switch circuit 120 and under a condition that the first switch circuit 110 is connected to the third switch circuit 130. In some embodiments, a level state output under a condition that the first switch circuit 110 is connected to the second switch circuit 120 and a level state under a condition that the first switch circuit is connected to the third switch circuit 130 are the same, that is, level states 3 are the same.

In these embodiments, in the cascade mode 1, as shown in FIG. 12, the cascade interface S5 is connected to the first switch interface S1. In this case, the first switch circuit 110 is connected to the second switch circuit 120, and the first switch circuit 110 may output one level state. In the cascade mode 2, as shown in FIG. 13, the cascade interface S5 is connected to the second switch interface S0. In this case, the first switch circuit 110 is connected to the third switch circuit 130, and the first switch circuit 110 may also output one level state. The first switch circuit 110 outputs a same level state in the cascade mode 1 and the cascade mode 2. A level state output by the first switch circuit 110 in the balance mode or the common mode is different from a level state output by the first switch circuit in the cascade mode (for example, the cascade mode 1). Therefore, in this case, whether the current topology uses the cascade mode may be determined based on the level state output by the first switch circuit 110, without distinguishing the cascade mode 1 or the cascade mode 2.

It may be understood that the first switch circuit 110 outputs the same level state in the cascade mode 1 and the cascade mode 2. In other words, no matter whether the cascade interface S5 may be connected to the first switch interface S1 or the second switch interface S0, there is no impact on the level state output by the first switch circuit 110. Therefore, in this case, the topology mode for the current topology may be determined based on the level state 1 output by the first switch circuit 110 and the level state 2 output by the second switch circuit 120, that is, the level state 3 output by the third switch circuit 130 may not be used. Certainly, the level state 3 output by the third switch circuit 130 may be used when necessary, to distinguish the cascade mode 1 and the cascade mode 2 in the cascade mode.

In some embodiments, in some implementations, the first switch circuit 110 outputs different level states under a condition that the first switch circuit 110 is connected to the second switch circuit 120 and under a condition that the first switch circuit 110 is connected to the third switch circuit 130. In some embodiments, one level state is output under a condition that the first switch circuit 110 is connected to the second switch circuit 120, and another level state is output under a condition that the first switch circuit 110 connected to the third switch circuit 130, that is, level states 3 are different.

It may be understood that in this case, a level state output by the first switch circuit 110 under a condition that the first switch circuit 110 is connected to the third switch circuit 130, that is, in the cascade mode 2, is the same as a level state output by the first switch circuit 110 in one of the balance mode or the common mode, making it difficult to recognize the topology mode. In these embodiments, a proper third switch circuit 130 is selected, and the third switch circuit 130 outputs different level states under a condition that the third switch circuit 130 is connected to the first switch circuit 110 and under a condition that the third switch circuit 130 is not connected to the first switch circuit 110, whereby the cascade mode 2 may be recognized.

In the cascade mode 2, the second switch interface S0 is connected to the cascade interface S5, that is, the third switch circuit 130 is connected to the first switch circuit 110. In this case, the third switch circuit 130 outputs one level state. In the balance mode, the common mode, or the cascade mode 1, the second switch circuit S0 is not connected to the cascade interface S5. For example, as shown in FIG. 12, the second switch interface S0 is connected to a second slot SLOT6. In this case, the third switch circuit 130 is not connected to the first switch circuit 110, and outputs another level state. Therefore, whether the current topology mode is the cascade mode 2 may be determined based on the level state 3 output by the third switch circuit 130. Under a condition that the current topology mode is not the cascade mode 2, as described above, it may be recognized, based on the first switch circuit 110 and the second switch circuit 120, whether the current topology mode is the balance mode, the common mode, or the cascade mode 1.

In these embodiments, even though different cascade modes (that is, the cascade mode 1 and the cascade mode 2) may affect the level state of the first switch circuit 110, it may be accurately recognized, based on the three level states output by the three switch circuits (that is, the first switch circuit 110, the second switch circuit 120, and the third switch circuit 130), whether the current topology mode is the balance mode, the common mode, the cascade mode 1, or the cascade mode 2.

Figure 14:
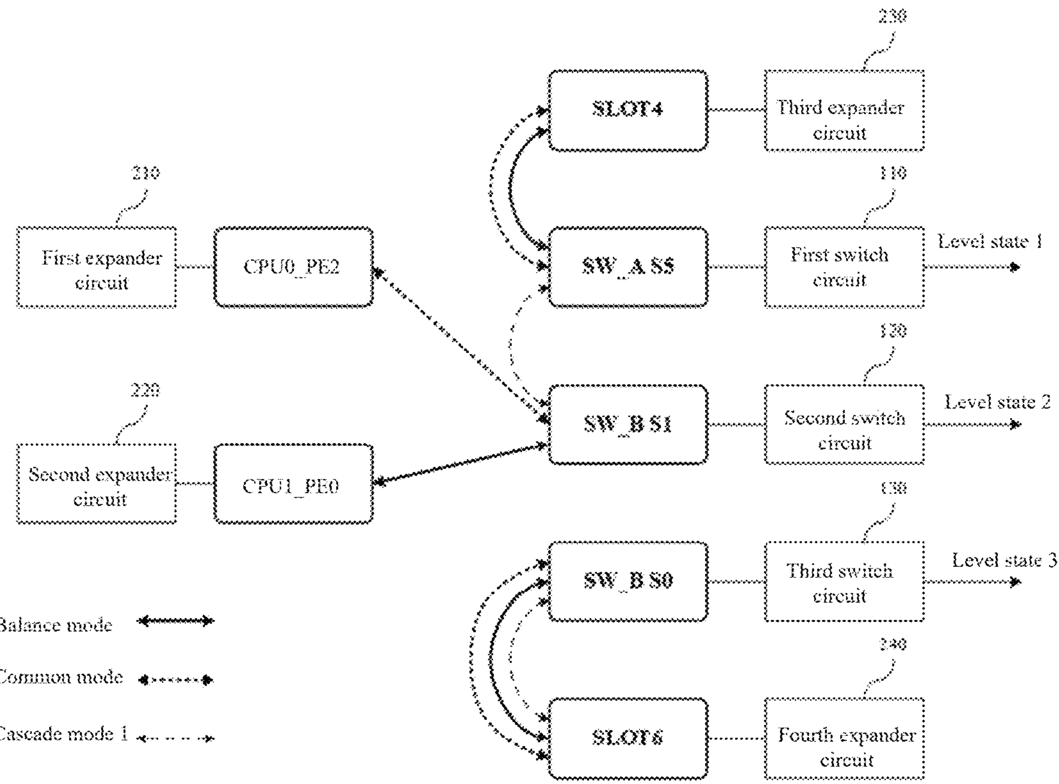
FIG. 14 is a schematic structural diagram of another recognition apparatus for the topology according to some embodiments of the present application.

In some embodiments, as shown in FIG. 14, the recognition apparatus may further include a third expander circuit 230 and/or a fourth expander circuit 240. The third expander circuit 230 is configured to be connected to a first slot SLOT4. The first slot SLOT4 is connected to a first switch SW_A. In the balance mode or the common mode, the cascade interface S5 is connected to the first slot SLOT4. The fourth expander circuit 240 is configured to be connected to the second slot SLOT6. The second slot SLOT6 is connected to the second switch SW_B. In the balance mode or the common mode, the second switch interface S0 is connected to the second slot SLOT6. FIG. 14 does not show a connection manner for cables in the cascade mode 2.

The expander circuits are disposed for the first slot SLOT4 and the second slot SLOT6, whereby a switch circuit may output a required level state based on a proper expander circuit under a condition that the switch circuit is connected to the third expander circuit 230 or the fourth expander circuit 240.

Figure 15:
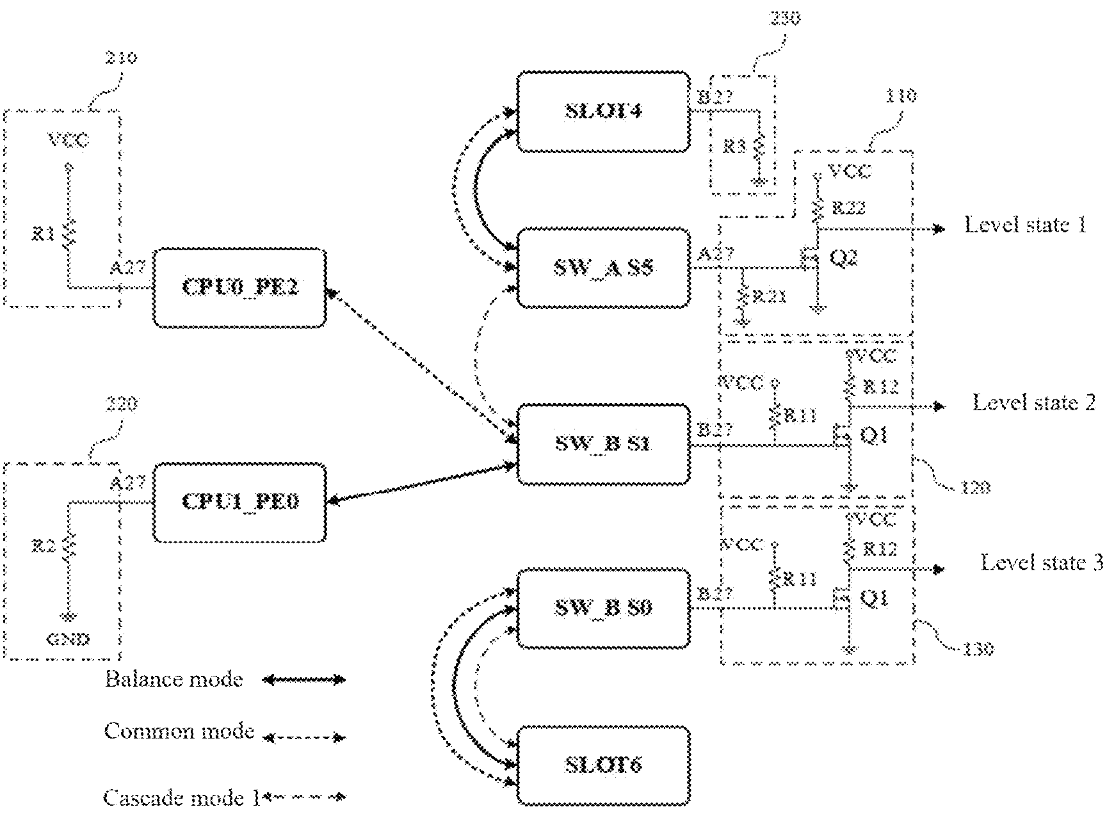
FIG. 15 is a schematic structural diagram of the recognition apparatus for the topology according to some embodiments of the present application.

According to some embodiments of the present application, some embodiments of the recognition apparatus for the topology is provided. FIG. 15 is a schematic structural diagram of the recognition apparatus for the topology according to some embodiments of the present application. As shown in FIG. 15, the recognition apparatus for the topology includes a first switch circuit 110, a second switch circuit 120, a first expander circuit 210, a second expander circuit 220, and a third switch circuit 130. In addition, the first switch circuit 110 outputs a same level state when the first switch circuit 110 is connected to the second switch circuit 120 and when the first switch circuit 110 is connected to the third switch circuit 130.

As shown in FIG. 15, the first switch circuit 110 is a passive switch circuit, and both the second switch circuit 120 and the third switch circuit 130 are active switch circuits.

In these embodiments, in a cascade mode 1, a cascade interface S5 is connected to a first switch interface S1, that is, the first switch circuit 110 is connected to the second switch circuit 120, that is, the passive switch circuit is connected to the active switch circuit, whereby both the first switch circuit 110 and the second switch circuit 120 output a first level state. The structure shown in FIG. 15 is used as an example. Both the first switch circuit 110 and the second switch circuit 120 output a low level. In a cascade mode 2, the cascade interface S5 is connected to a second switch interface S0, that is, the first switch circuit 110 is connected to the third switch circuit 130, and in this case, the passive switch circuit is connected to the active switch circuit, whereby both the first switch circuit 110 and the third switch circuit 130 still output the first level state. The structure shown in FIG. 15 is used as an example. Both the first switch circuit 110 and the second switch circuit 120 output a low level. Therefore, the level state output by the first switch circuit 110 in the cascade mode 1 or the cascade mode 2 is the first level state.

In order to cause the first switch circuit 110 to output a second level state in a balance mode or a common mode, a third expander circuit 230 may be disposed for a first slot SLOT4, and the third expander circuit 230 is a pull-down circuit. The third expander circuit 230 is configured to be connected to the first slot SLOT4. The first slot SLOT4 is connected to a first switch SW_A. In the balance mode or the common mode, the cascade interface S5 is connected to the first slot SLOT4.

The structure shown in FIG. 15 is used as an example. In the balance mode, a second transistor Q2 of the first switch circuit 110 is cut off, and a level state 1 output by the first switch circuit is a high level; and a first transistor Q1 of the second switch circuit 120 is cut off, and a level state 2 output by the second switch circuit is a high level. In the common mode, the level state 1 output by the first switch circuit 110 remains unchanged, and is still a high level; and the first transistor Q1 of the second switch circuit 120 is conducted, and the level state 2 output by the second switch circuit is a low level. In the cascade mode 1, both the second transistor Q2 of the first switch circuit 110 and the first transistor Q1 of the second switch circuit 120 are conducted, whereby both the level state 1 and the level state 2 are low levels. In the cascade mode 2 (FIG. 15 does not show a connection manner in the cascade mode 2), both the second transistor Q2 of the first switch circuit 110 and the first transistor Q1 of the third switch circuit 130 are conducted, whereby both the level state 1 and a level state 3 are low levels.

1 represents a high level, and 0 represents a low level. For the three level states in the four modes, refer to the following Table 1. "-" represents a level state that needs no attention, which may be a high level or a low level.

TABLE 1

| Mode | Level state 1 | Level state 2 | Level state 3 |
|---|---|---|---|
| Balance mode | 1 | 1 | — |
| Common mode | 1 | 0 | — |
| Cascade mode 1 | 0 | 0 | — |
| Cascade mode 2 | 0 | — | 0 |

It may be understood that under a condition that the first expander circuit 210 is a pull-down circuit, and the second expander circuit 220 is a pull-up circuit, the level state 2 is affected, that is, the level state 2 is a low level in the balance mode, and the level state 2 is a high level in the common mode. A current topology mode may still be determined based on the three level states. This is not described subsequently in detail.

A switch circuit and an expander circuit are connected to idle pins of PCIe interfaces, to implement connection to the corresponding interfaces. In addition, when pins of a PCIe interface are divided on an A side and a B side, and two PCIe interfaces are connected, pins on an A side of one PCIe interface may be connected to pins on a B side of the other PCIe interface. In these embodiments, a pin 27 of the PCIe interface is idle pin, whereby the switch circuit and the expander circuit are connected to the pin 27 of a corresponding interface. In addition, the pin 27 on the A side is marked as A27, and the pin 27 on the B side is marked as B27. Connection to the pin A27 or the pin B27 may connect the switch circuit and the expander circuit to the corresponding PCIe interface, and under a condition that two PCIe interfaces are connected, connection between the switch circuit and the expander circuit may be implemented.

As shown in FIG. 15, both the first expander circuit 210 and the second expander circuit 220 are connected to the pin A27, and The second switch circuit 120 is connected to a pin B27 of the first switch interface S1, whereby the second switch circuit 120 may be connected to the first expander circuit 210 or the second expander circuit 220. The first switch circuit 110 is connected to a pin A27 of the cascade interface S7, and the third switch circuit 130 is connected to a pin B27 of the second switch interface S0, whereby in the cascade mode 1 or the cascade mode 2, the first switch circuit 110 may be connected to the second switch circuit 120 and the third switch circuit 130. Correspondingly, the third expander circuit 230 is connected to a pin B27 of the first slot SLOT4. Under a condition that there is the fourth expander circuit, the fourth expander circuit is connected to a pin A27 of the second slot SLOT6.

According to the recognition apparatus for the topology provided in these embodiments, cascade modes in which different connection manners are used have no impact on the level state output by the first switch circuit 110, and the current topology mode may be recognized.

Figure 16:
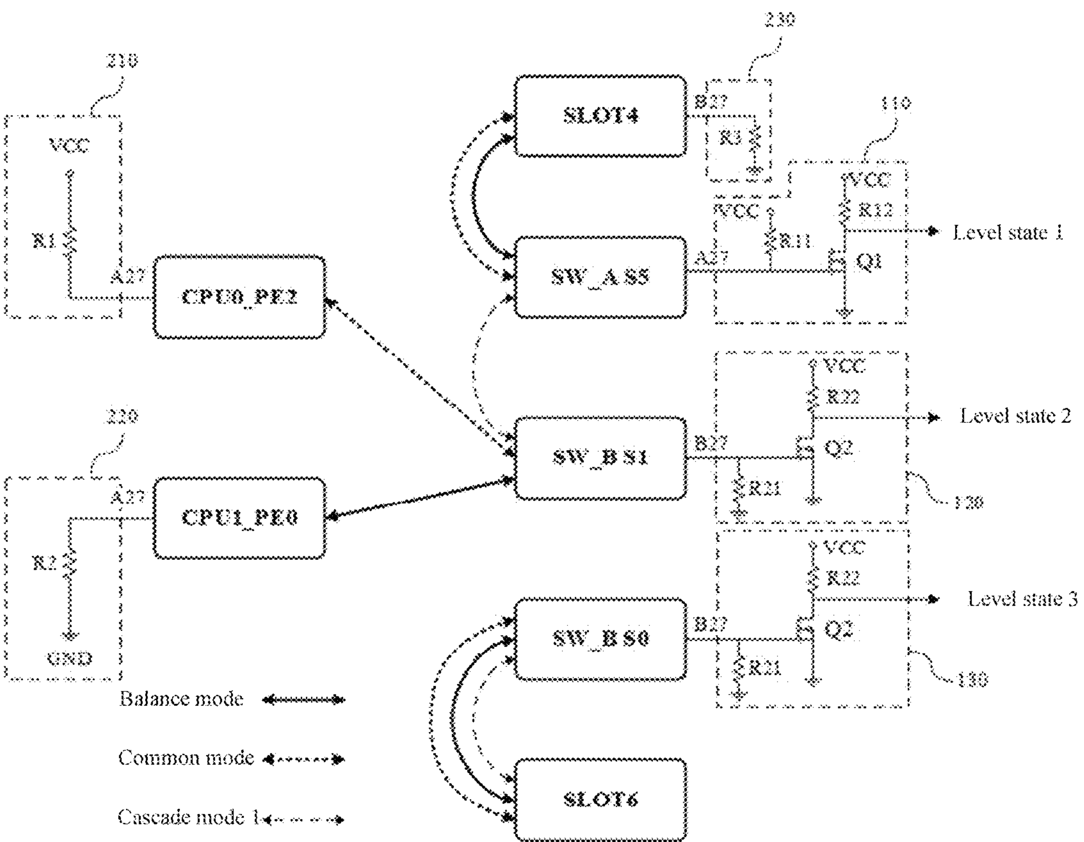
FIG. 16 is a schematic structural diagram of the recognition apparatus for the topology according to some embodiments of the present application.

According to some embodiments of the present application, some embodiments of the recognition apparatus for the topology is provided. FIG. 16 is a schematic structural diagram of the recognition apparatus for the topology according to some embodiments of the present application. As shown in FIG. 16, the recognition apparatus for the topology includes a first switch circuit 110, a second switch circuit 120, a first expander circuit 210, a second expander circuit 220, and a third switch circuit 130. In addition, the first switch circuit 110 outputs a same level state under a condition that the first switch circuit 110 is connected to the second switch circuit 120 and under a condition that the first switch circuit 110 is connected to the third switch circuit 130.

As shown in FIG. 16, the first switch circuit 110 is an active switch circuit. The second switch circuit 120 and the third switch circuit 130 may be active switch circuits, or may be passive switch circuits. This is not limited in these embodiments. In FIG. 16, an example in which both the second switch circuit 120 and the third switch circuit 130 are passive switch circuits is used.

In these embodiments, under a condition that the first switch circuit 110 is an active switch circuit, the active switch circuit outputs a first level state no matter what types of switch circuits the second switch circuit 120 and the third switch circuit 130 are. Therefore, the first switch circuit 110 outputs a same level state in a cascade mode 1 or a cascade mode 2, that is, a first level state. For example, the structure shown in FIG. 16 is used as an example. Under a condition that the active switch circuit is connected to an active switch circuit or a passive switch circuit, transistors (including a first transistor Q1 and a second transistor Q2) are conducted, whereby a level state 1 output by the first switch circuit 110 is a low level.

In order to cause the first switch circuit 110 to output a second level state in a balance mode or a common mode, a third expander circuit 230 may be disposed for a first slot SLOT4, and the third expander circuit 230 is a pull-down circuit. The third expander circuit 230 is configured to be connected to the first slot SLOT4. The first slot SLOT4 is connected to a first switch SW_A. In the balance mode or the common mode, a cascade interface S5 is connected to the first slot SLOT4.

The structure shown in FIG. 16 is used as an example. In the balance mode, the first transistor Q1 of the first switch circuit 110 is cut off, and the level state 1 output by the first switch circuit is a high level; and a second transistor Q2 of the second switch circuit 120 is cut off, and a level state 2 output by the second switch circuit is a high level. In the common mode, the level state 1 output by the first switch circuit 110 remains unchanged, and is still a high level; and the second transistor Q2 of the second switch circuit 120 is conducted, and the level state 2 output by the second switch circuit is a low level. In the cascade mode 1, both the first transistor Q1 of the first switch circuit 110 and the second transistor Q2 of the second switch circuit 120 are conducted, whereby both the level state 1 and the level state 2 are low levels. In the cascade mode 2 (FIG. 16 does not show a connection manner in the cascade mode 2), both the first transistor Q1 of the first switch circuit 110 and the second transistor Q2 of the third switch circuit 130 are conducted, whereby both the level state 1 and a level state 3 are low levels.

Cases of the three level states in the four modes are the same as those described in the foregoing embodiments, and reference may be made to the foregoing Table 1.

According to the recognition apparatus for the topology provided in these embodiments, cascade modes in which different connection manners are used have no impact on the level state output by the first switch circuit 110, and a current topology mode may be recognized.

Figure 17:
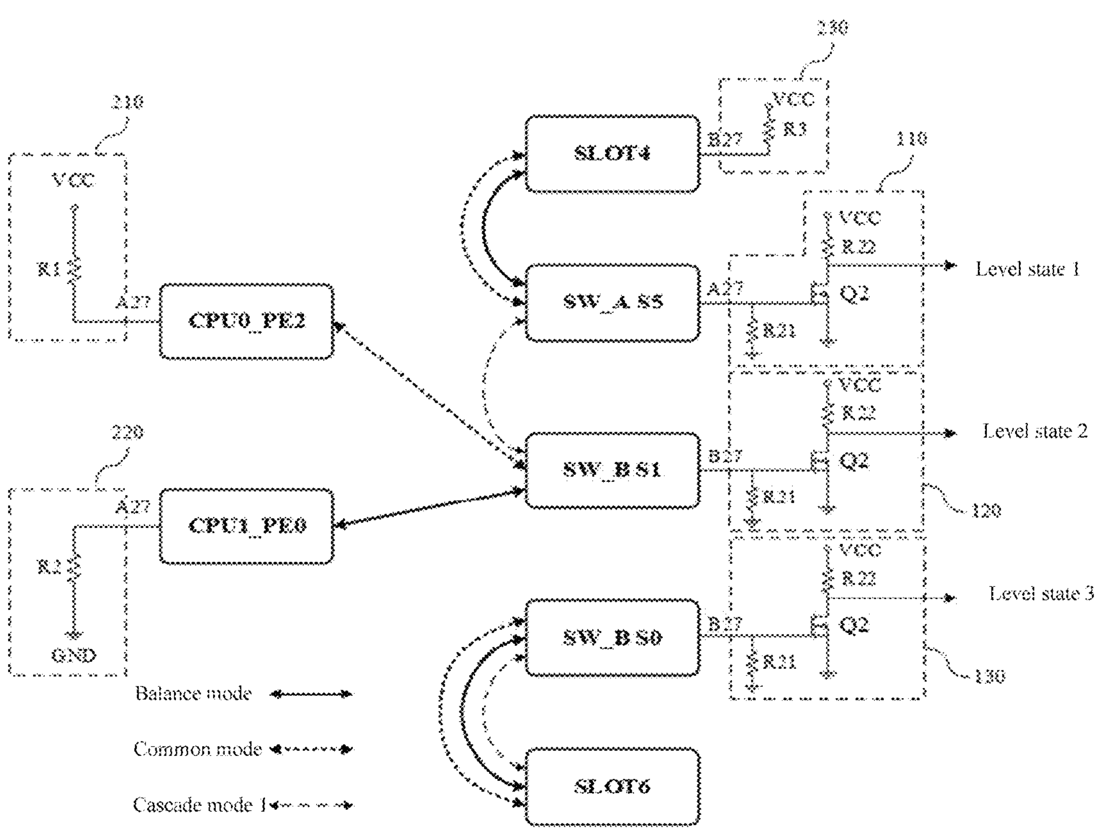
FIG. 17 is a schematic structural diagram of the recognition apparatus for the topology according to some embodiments of the present application.

According to some embodiments of the present application, some embodiments of the recognition apparatus for the topology is provided. FIG. 17 is a schematic structural diagram of the recognition apparatus for the topology according to some embodiments of the present application. As shown in FIG. 17, the recognition apparatus for the topology includes a first switch circuit 110, a second switch circuit 120, a first expander circuit 210, a second expander circuit 220, and a third switch circuit 130. In addition, the first switch circuit 110 outputs a same level state when the first switch circuit 110 is connected to the second switch circuit 120 and under a condition that the first switch circuit 110 is connected to the third switch circuit 130.

The first switch circuit 110, the second switch circuit 120, and the third switch circuit 130 are all passive switch circuits. The first switch circuit 110 outputs a second level state under a condition that the first switch circuit 110 is connected to the second switch circuit 120 or the third switch circuit 130. For example, the structure shown in FIG. 17 is used as an example. Under a condition that the passive switch circuits are connected to each other, the second transistors Q2 in the circuits are cut off, whereby a level state 1 output by the first switch circuit 110 is a high level.

In addition, in order to cause the first switch circuit 110 to output a first level state in a balance mode or a common mode, a third expander circuit 230 may be disposed for a first slot SLOT4, and the third expander circuit 230 is a pull-up circuit. The third expander circuit 230 is configured to be connected to a first slot SLOT4. The first slot SLOT4 is connected to a first switch SW_A. In the balance mode or the common mode, a cascade interface S5 is connected to the first slot SLOT4.

As shown in FIG. 17, in the balance mode, a second transistor Q2 of the first switch circuit 110 is conducted, and the level state 1 output by the first switch circuit is a low level; and a second transistor Q2 of the second switch circuit 120 is cut off, and a level state 2 output by the second switch circuit is a high level. In the common mode, the level state 1 output by the first switch circuit 110 remains unchanged, and is still a low level; and the second transistor Q2 of the second switch circuit 120 is conducted, and the level state 2 output by the second switch circuit is a low level. In a cascade mode 1, both the second transistor Q2 of the first switch circuit 110 and the second transistor Q2 of the second switch circuit 120 are cut off, whereby both the level state 1 and the level state 2 are high levels. In a cascade mode 2 (FIG. 17 does not show a connection manner in the cascade mode 2), both the second transistor Q2 of the first switch circuit 110 and the second transistor Q2 of the third switch circuit 130 are cut off, whereby both the level state 1 and a level state 3 are high levels.

1 represents a high level, and 0 represents a low level. For the three level states in the four modes, refer to the following Table 2. "-" represents a level state that needs no attention, which may be a high level or a low level.

TABLE 2

| Mode | Level state 1 | Level state 2 | Level state 3 |
|---|---|---|---|
| Balance mode | 0 | 1 | — |
| Common mode | 0 | 0 | — |
| Cascade mode 1 | 1 | 1 | — |
| Cascade mode 2 | 1 | — | 1 |

According to the recognition apparatus for the topology provided in these embodiments, cascade modes in which different connection manners are used have no impact on the level state output by the first switch circuit 110, and a current topology mode may be recognized.

Figure 18:
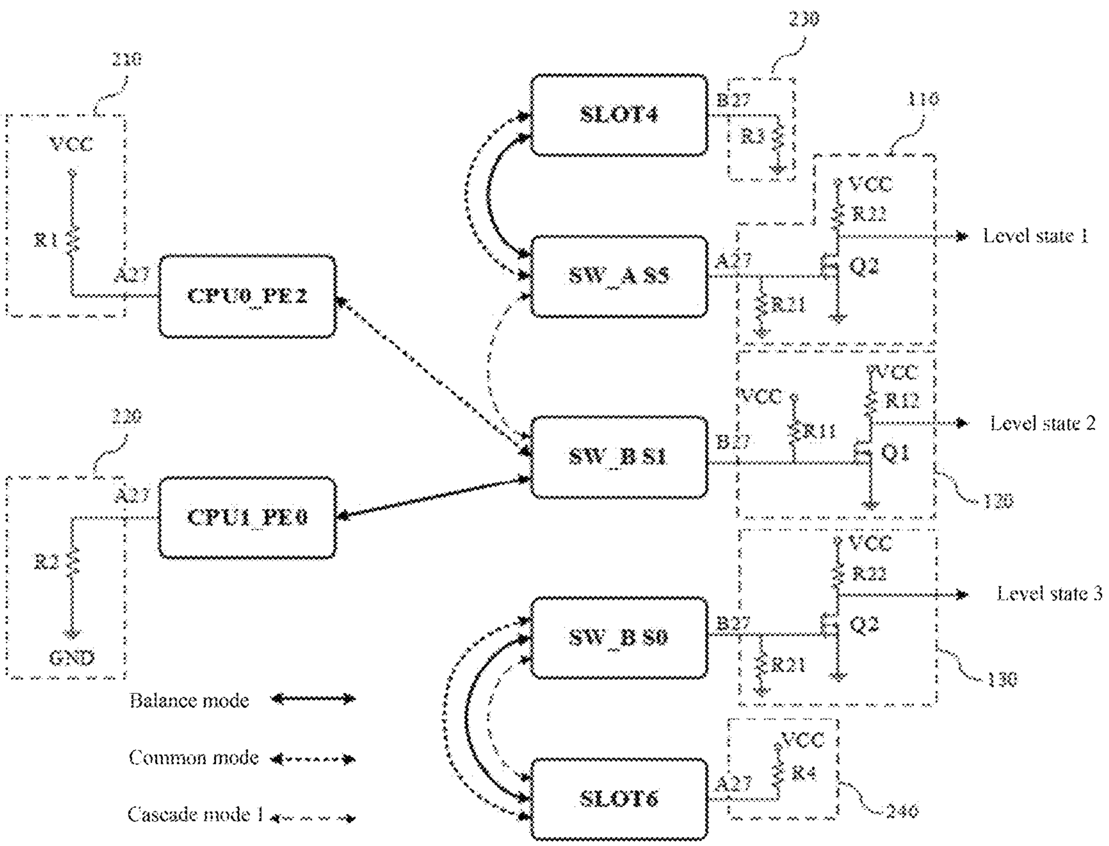
FIG. 18 is a schematic structural diagram of the recognition apparatus for the topology according to some embodiments of the present application.

According to some embodiments of the present application, some embodiments of the recognition apparatus for the topology is provided. FIG. 18 is a schematic structural diagram of the recognition apparatus for the topology according to some embodiments of the present application. As shown in FIG. 18, the recognition apparatus for the topology includes a first switch circuit 110, a second switch circuit 120, a third switch circuit 130, a first expander circuit 210, and a second expander circuit 220. In a cascade mode 1 or a cascade mode 2, the first switch circuit 110 outputs a different level state, and the third switch circuit 130 also outputs a different level state.

In addition, as shown in FIG. 18, the recognition apparatus further includes a fourth expander circuit 240. The fourth expander circuit 240 is configured to be connected to a second slot SLOT6. The second slot SLOT6 is connected to a second switch SW_B. In a balance mode or a common mode, a second switch interface S0 is connected to the second slot SLOT6. The third switch circuit 130 outputs different level states under a condition that the third switch circuit 130 is connected to the first switch circuit 110 and when the third switch circuit 130 is connected to the fourth expander circuit 240.

In these embodiments, in the cascade mode 2, a cascade interface S5 is connected to the second switch interface S0, that is, the third switch circuit 130 is connected to the first switch circuit 110. In the balance mode, the common mode, or the cascade mode 1, the second switch interface S0 is connected to the second slot SLOT6, that is, the third switch circuit 130 is connected to the fourth expander circuit 240. The third switch circuit 130 outputs different level states in the two cases. Therefore, whether a current topology mode is the cascade mode 2 may be determined based on a level state output by the third switch circuit 130. Further, under a condition that the current topology mode is not the cascade mode 2, it may be determined, based on level states output by the first switch circuit 110 and the second switch circuit 120, whether the current topology uses the balance mode, the common mode, or the cascade mode 1.

In some embodiments, as shown in FIG. 18, the recognition apparatus further includes a third expander circuit 230. The third expander circuit 230 is configured to be connected to a first slot SLOT4. The first slot SLOT4 is connected to a first switch SW_A. In the balance mode or the common mode, the cascade interface S5 is connected to the first slot SLOT4. The third expander circuit 230 is a pull-down circuit, and the fourth expander circuit 240 is a pull-up circuit. The first switch circuit 110 is a passive switch circuit, the second switch circuit 120 is an active switch circuit, and the third switch circuit 130 is a passive switch circuit. A pull-down circuit is used as the third expander circuit, whereby the first switch circuit 110 may respectively output different level states in the cascade mode 1 and the balance mode or the common mode. Reference may be made to the first case described in the foregoing embodiments.

As shown in FIG. 18, in the balance mode, a second transistor Q2 of the first switch circuit 110 is cut off, and a level state 1 output by the first switch circuit is a high level; and a first transistor Q1 of the second switch circuit 120 is cut off, and a level state 2 output by the second switch circuit is a high level. In the common mode, the level state 1 output by the first switch circuit 110 remains unchanged, and is still a high level; and the first transistor Q1 of the second switch circuit 120 is conducted, and the level state 2 output by the second switch circuit is a low level. In the cascade mode 1, both the second transistor Q2 of the first switch circuit 110 and the first transistor Q1 of the second switch circuit 120 are conducted, whereby both the level state 1 and the level state 2 are low levels. In the cascade mode 2 (FIG. 18 does not show a connection manner in the cascade mode 2), both the second transistor Q2 of the first switch circuit 110 and the second transistor Q2 of the third switch circuit 130 are cut off, whereby both the level state 1 and a level state 3 are high levels.

In addition, in the cascade mode 2, the second switch circuit 120 is connected to the fourth expander circuit 240, whereby the first transistor Q1 of the second switch circuit 120 is conducted, and the level state 2 output by the second switch circuit is a low level. In order to distinguish the common mode and the cascade mode 2, the third switch circuit 130 needs to output a different level state in the common mode or the cascade mode 2. In these embodiments, the fourth expander circuit 240 is a pull-up circuit, whereby in the common mode, the third switch circuit 130 is connected to the fourth expander circuit 240, the second transistor Q2 of the third switch circuit 130 is conducted, and the level state 3 output by the third switch circuit is a low level, different from a high level output by the third switch circuit in the cascade mode 2. Therefore, the common mode and the cascade mode 2 may be distinguished.

1 represents a high level, and 0 represents a low level. For the three level states in the four modes, refer to the following Table 3. "-" represents a level state that needs no attention, which may be a high level or a low level. It may be learned from the structure shown in FIG. 18 that the level state 3 remains unchanged in the balance mode, the common mode, or the cascade mode 1. Therefore, in the following Table 3, the level state 3 is also a low level in the balance mode or the cascade mode 1.

TABLE 3

| Mode | Level state 1 | Level state 2 | Level state 3 |
|---|---|---|---|
| Balance mode | 1 | 1 | — |
| Common mode | 1 | 0 | 0 |
| Cascade mode 1 | 0 | 0 | — |
| Cascade mode 2 | 1 | 0 | 1 |

According to the recognition apparatus for the topology provided in these embodiments, when cascade modes in which different connection manners are used have impact on an output of the first switch circuit 110, with reference to the three level states output by the three switch circuits, the current topology mode may still be recognized, and it may be determined whether the current topology mode is the balance mode, the common mode, the cascade mode 1, or the cascade mode 2.

Figure 19:
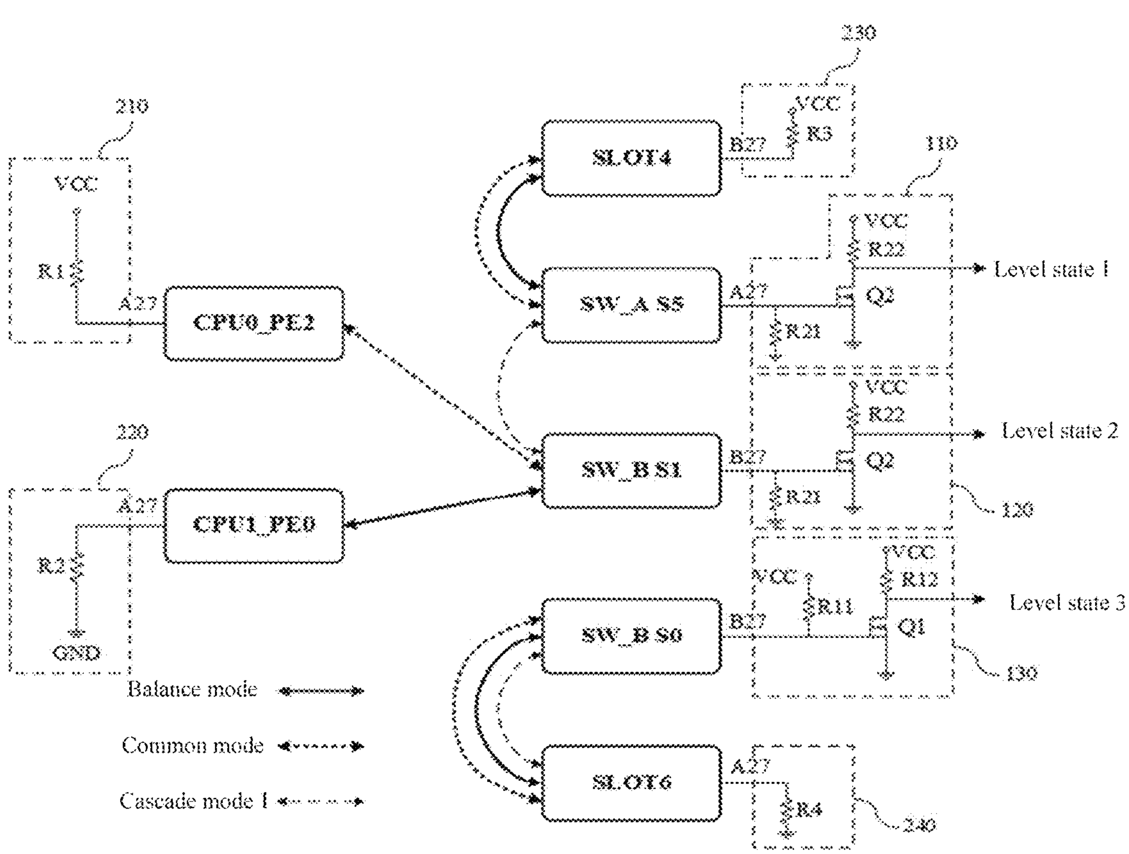
FIG. 19 is a schematic structural diagram of the recognition apparatus for the topology according to some embodiments of the present application.

According to some embodiments of the present application, some embodiments of the recognition apparatus for the topology is provided. FIG. 19 is a schematic structural diagram of the recognition apparatus for the topology according to some embodiments of the present application. As shown in FIG. 19, the recognition apparatus for the topology includes a first switch circuit 110, a second switch circuit 120, a third switch circuit 130, a first expander circuit 210, and a second expander circuit 220. In a cascade mode 1 or a cascade mode 2, the first switch circuit 110 outputs a different level state, and the third switch circuit 130 also outputs a different level state.

In addition, as shown in FIG. 19, the recognition apparatus further includes a fourth expander circuit 240. The fourth expander circuit 240 is configured to be connected to a second slot SLOT6. The second slot SLOT6 is connected to a second switch SW_B. In a balance mode or a common mode, a second switch interface S0 is connected to the second slot SLOT6. The third switch circuit 130 outputs different level states under a condition that the third switch circuit 130 is connected to the first switch circuit 110 and under a condition that the third switch circuit 130 is connected to the fourth expander circuit 240.

In these embodiments, in the cascade mode 2, a cascade interface S5 is connected to the second switch interface S0, that is, the third switch circuit 130 is connected to the first switch circuit 110. In the balance mode, the common mode, or the cascade mode 2, the second switch interface S0 is connected to the second slot SLOT6, that is, the third switch circuit 130 is connected to the fourth expander circuit 240. The third switch circuit 130 outputs different level states in the two cases. Therefore, whether a current topology mode is the cascade mode 2 may be determined based on a level state output by the third switch circuit 130. Further, under a condition that the current topology mode is not the cascade mode 2, it may be determined, based on level states output by the first switch circuit 110 and the second switch circuit 120, whether the current topology uses the balance mode, the common mode, or the cascade mode 1.

In some embodiments, as shown in FIG. 19, the recognition apparatus further includes a third expander circuit 230. The third expander circuit 230 is configured to be connected to a first slot SLOT4. The first slot SLOT4 is connected to a first switch SW_A. In the balance mode or the common mode, the cascade interface S5 is connected to the first slot SLOT4. The third expander circuit 230 is a pull-up circuit, and the fourth expander circuit 240 is a pull-down circuit. The first switch circuit 110 is a passive switch circuit, the second switch circuit 120 is a passive switch circuit, and the third switch circuit 130 is an active switch circuit. A pull-up circuit is used as the third expander circuit, whereby the first switch circuit 110 may respectively output different level states in the cascade mode 1 and the balance mode or the common mode. Reference may be made to the fourth case described in the foregoing embodiments.

As shown in FIG. 19, in the balance mode, a second transistor Q2 of the first switch circuit 110 is conducted, and a level state 1 output by the first switch circuit is a low level; and a second transistor Q2 of the second switch circuit 120 is cut off, and a level state 2 output by the second switch circuit is a high level. In the common mode, the level state 1 output by the first switch circuit 110 remains unchanged, and is still a low level; and the second transistor Q2 of the second switch circuit 120 is conducted, and the level state 2 output by the second switch circuit is a low level. In the cascade mode 1, both the second transistor Q2 of the first switch circuit 110 and the second transistor Q2 of the second switch circuit 120 are cut off, whereby both the level state 1 and the level state 2 are high levels. In the cascade mode 2 (FIG. 19 does not show a connection manner in the cascade mode 2), both the second transistor Q2 of the first switch circuit 110 and the first transistor Q1 of the third switch circuit 130 are conducted, whereby both the level state 1 and a level state 3 are low levels.

In addition, in the cascade mode 2, the second switch circuit 120 is connected to the fourth expander circuit 240, whereby the second transistor Q2 of the second switch circuit 120 is cut off, and the level state 2 output by the second switch circuit is a high level. In order to distinguish the balance mode and the cascade mode 2, the third switch circuit 130 needs to output a different level state in the balance mode or the cascade mode 2. In these embodiments, the fourth expander circuit 240 is a pull-down circuit, whereby in the balance mode, the third switch circuit 130 is connected to the fourth expander circuit 240, the first transistor Q1 of the third switch circuit 130 is cut off, and the level state 3 output by the third switch circuit is a high level, different from a low level output by the third switch circuit in the cascade mode 2. Therefore, the balance mode and the cascade mode 2 may be distinguished.

1 represents a high level, and 0 represents a low level. For the three level states in the four modes, refer to the following Table 4. "-" represents a level state that needs no attention, which may be a high level or a low level. It may be learned from the structure shown in FIG. 19 that the level state 3 remains unchanged in the balance mode, the common mode, or the cascade mode 1. Therefore, in the following Table 4, the level state 3 is also a high level in the common mode or the cascade mode 1.

TABLE 4

| Mode | Level state 1 | Level state 2 | Level state 3 |
|---|---|---|---|
| Balance mode | 0 | 1 | 1 |
| Common mode | 0 | 0 | — |
| Cascade mode 1 | 1 | 1 | — |
| Cascade mode 2 | 0 | 1 | 0 |

According to the recognition apparatus for the topology provided in these embodiments, when cascade modes in which different connection manners are used have impact on an output of the first switch circuit 110, with reference to the three level states output by the three switch circuits, the current topology mode may still be recognized, and it may be determined whether the current topology mode is the balance mode, the common mode, the cascade mode 1, or the cascade mode 2.

Figure 20:
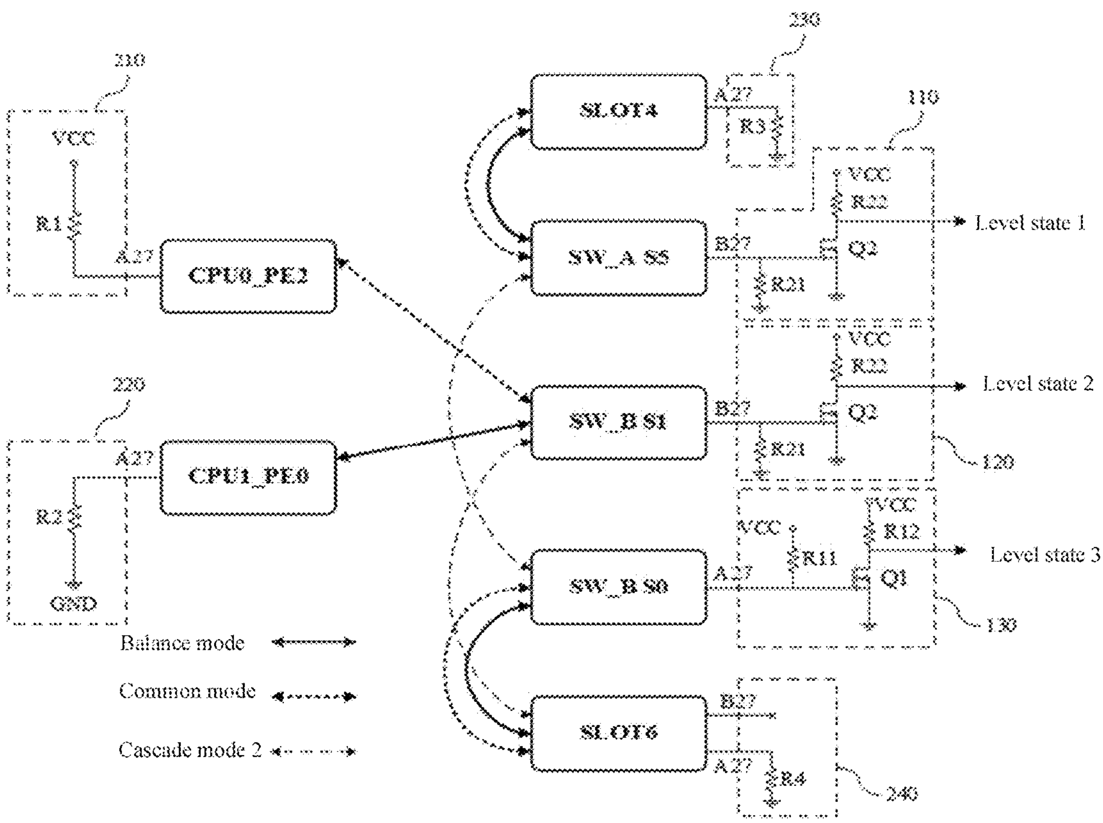
FIG. 20 is a schematic structural diagram of the recognition apparatus for the topology according to some embodiments of the present application.

According to some embodiments of the present application, some embodiments of the recognition apparatus for the topology is provided. The recognition apparatus may recognize whether a current topology is a balance mode, a common mode, or a cascade mode 2. In other words, the recognition apparatus may not recognize a cascade mode 1. FIG. 20 is a schematic structural diagram of the recognition apparatus for the topology according to some embodiments of the present application. As shown in FIG. 20, the recognition apparatus for the topology includes a first switch circuit 110, a second switch circuit 120, a third switch circuit 130, a first expander circuit 210, a second expander circuit 220, a third expander circuit 230, and a fourth expander circuit 240.

As shown in FIG. 20, the first switch circuit 110 is a passive switch circuit, the second switch circuit 120 is a passive switch circuit, and the third switch circuit 130 is an active switch circuit. The first expander circuit 210 is a pull-up circuit, the second expander circuit 220 is a pull-down circuit, and in addition, both the third expander circuit 230 and the fourth expander circuit 240 are pull-down circuits.

In the balance mode, a second transistor Q2 of the first switch circuit 110 is cut off, and a level state 1 output by the first switch circuit is a high level; and a second transistor Q2 of the second switch circuit 120 is cut off, and a level state 2 output by the second switch circuit is a high level. In addition, the third switch circuit 130 is connected to a pin A27 of a second switch interface S0, and a pin B27 of a second slot SLOT6 is suspended, whereby the first transistor Q1 of the third switch circuit 130 is conducted, and a level state 3 output by the second switch circuit is a low level.

In the common mode, the level state 1 output by the first switch circuit 110 remains unchanged, and is still a high level; the second transistor Q2 of the second switch circuit 120 is conducted, and the level state 2 output by the second switch circuit is a low level; and the level state 3 output by the third switch circuit 130 also remains unchanged, and is still a low level.

In the cascade mode 2, both the second transistor Q2 of the first switch circuit 110 and the first transistor Q1 of the third switch circuit 130 are conducted, whereby both the level state 1 and the level state 3 are low levels. The second switch circuit 120 is connected to a pin A27 of the second slot SLOT6, the second transistor Q2 of the second switch circuit 120 is cut off, and the level state output by the second switch circuit is a high level.

In addition, in the cascade mode 2, the second switch circuit 120 is connected to the fourth expander circuit 240, whereby the second transistor Q2 of the second switch circuit 120 is cut off, and the level state 2 output by the second switch circuit is a high level. In order to distinguish the balance mode and the cascade mode 2, the third switch circuit 130 needs to output a different level state in the balance mode or the cascade mode 2. In these embodiments, the fourth expander circuit 240 is a pull-down circuit, whereby in the balance mode, the third switch circuit 130 is connected to the fourth expander circuit 240, the first transistor Q1 of the third switch circuit 130 is cut off, and the level state 3 output by the third switch circuit is a high level, different from a low level output by the third switch circuit in the cascade mode 2. Therefore, the balance mode and the cascade mode 2 may be distinguished.

1 represents a high level, and 0 represents a low level. For the three level states in the three modes, refer to the following Table 5.

TABLE 5

| Mode | Level state 1 | Level state 2 | Level state 3 |
|---|---|---|---|
| Balance mode | 1 | 1 | 0 |
| Common mode | 1 | 0 | 0 |
| Cascade mode 2 | 0 | 1 | 0 |

According to the recognition apparatus for the topology provided in these embodiments, with reference to the three level states output by the three switch circuits, a current topology mode may be recognized, and it may be determined whether the current topology mode is the balance mode, the common mode, or the cascade mode 2.

Figure 21:
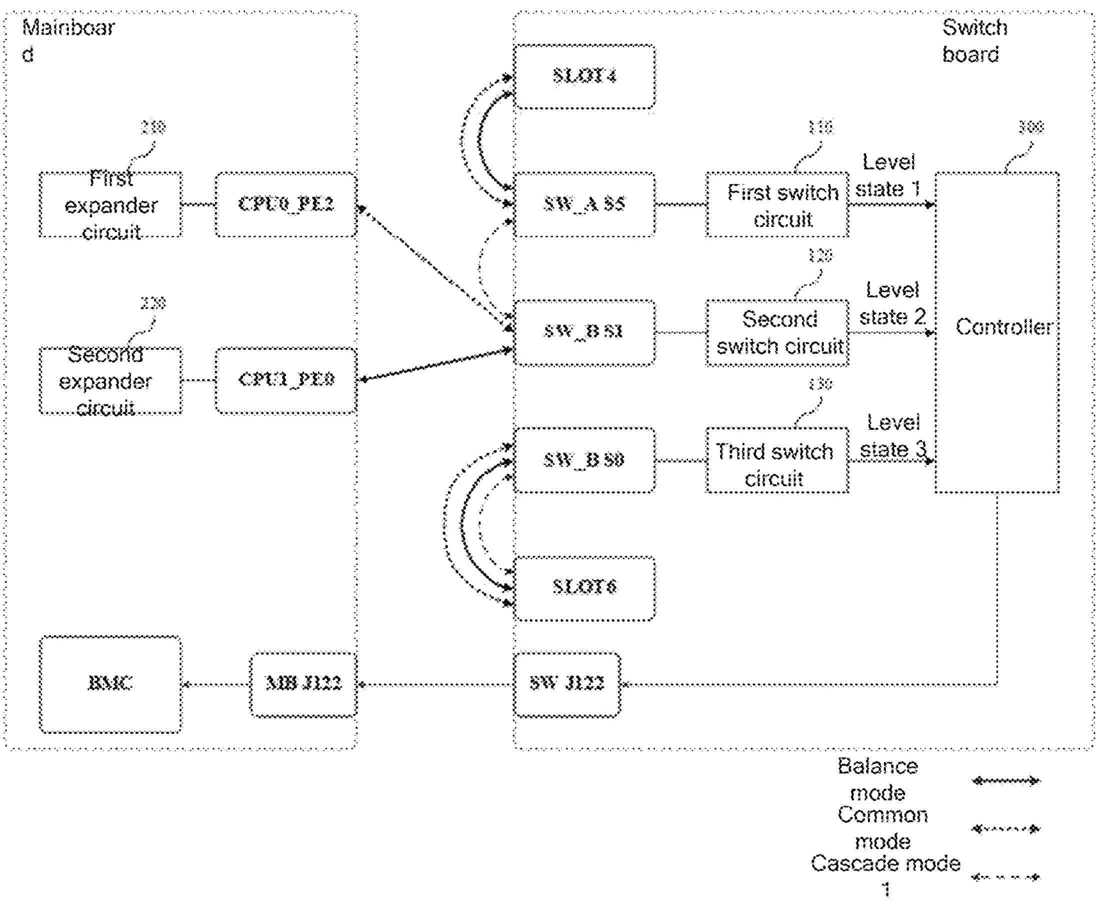
FIG. 21 is a schematic structural diagram of the recognition apparatus for the topology according to some embodiments of the present application.

According to some embodiments of the present application, some embodiments of the recognition apparatus for the topology is provided. The recognition apparatus may include a circuit in the recognition apparatus provided in any one of the foregoing embodiments, for example, the first switch circuit 110, the second switch circuit 120, the first expander circuit 210, and the second expander circuit 220. In addition, the recognition apparatus further includes a controller 300. FIG. 21 is a schematic structural diagram of the recognition apparatus for the topology according to some embodiments of the present application.

The controller 300 is connected to output ends of a plurality of switch circuits, and is configured to determine a current topology mode based on level states output by the plurality of switch circuits. The plurality of switch circuits include the first switch circuit 110 and the second switch circuit 120. In some embodiments, the plurality of switch circuit may further include the third switch circuit 130. The controller 300 acquires a level state 1 and a level state 2, or acquires a level state 1, a level state 2, and a level state 3, and may determine the current topology mode based on high/low levels represented by the level states. The controller 300 may be an apparatus with a logical function, for example, a complex programmable logic device (CPLD) and a field programmable gate array (FPGA).

Based on a same application conception, some embodiments of the present application further provide a server. The server may be an AI server. As shown in FIG. 21, the server includes a first processor CPU0, a second processor CPU1, a first switch SW_A, a second switch SW_B, and the recognition apparatus provided in any one of the foregoing embodiments.

As shown in FIG. 21, the first processor CPU0 and the second processor CPU1 are located at a mainboard (MB), and the first switch SW_A and the second switch SW_B are located at a switch board (SW board). In addition, the first expander circuit 210 and the second expander circuit 220 may be disposed on the mainboard, and the first switch circuit 110 and the second switch circuit 120 may be disposed on the switch board. Similarly, the third switch circuit 130, the third expander circuit 230, the fourth expander circuit 240, and the like may also be disposed on the switch board. Based on a plurality of switch states output by the recognition apparatus, a connection manner between the processors and the switches of the server may be determined, that is, a topology mode may be determined.

In some embodiments, the server further includes a BMC. The BMC is connected to the controller 300 of the recognition apparatus, and obtains a current topology mode determined by the controller 300. As shown in FIG. 21, the controller 300 communicates with the BMC through an interface J122. For example, the interface J122 may be an inter-integrated circuit (I2C) interface.

As shown in FIG. 21, after cables between the processors and the switches are inserted, the recognition apparatus may output corresponding level states, whereby the controller 300 may determine a PCIe topology of the server based on the level states, and notifies the BMC through the I2C, to enable personnel on a production line to learn the current PCIe topology of the server from a web page of the BMC.

Although the embodiments of the present application are described with reference to the accompanying drawings, a person skilled in the art may make various modifications and transformations without departing from the spirit and scope of the present application, and all such modifications and transformations fall within the scope defined by the claims appended.

The invention claimed is:

1. A recognition apparatus for a topology, comprising a first switch circuit, a second switch circuit, a first expander circuit, and a second expander circuit, wherein the first switch circuit is configured to be connected to a cascade interface of a first switch, and the second switch circuit is configured to be connected to a switch interface of a second switch; in a cascade mode, the cascade interface is connected to the switch interface of the second switch;

the first expander circuit is configured to be connected to an interface of a first processor, and the second expander circuit is configured to be connected to an interface of a second processor; in a balance mode, the switch interface of the second switch is connected to the interface of the second processor; in a common mode, the switch interface of the second switch is connected to the interface of the first processor;

the first switch circuit outputs different level states under a condition that the first switch circuit is connected to the switch interface of the second switch and under a condition that the first switch circuit is not connected to the switch interface of the second switch; and the second switch circuit outputs the different level states under a condition that the second switch circuit is connected to the first expander circuit and under a condition that the second switch circuit is connected to the second expander circuit.

2. The recognition apparatus according to claim 1, wherein the first switch circuit is an active switch circuit or a passive switch circuit, the second switch circuit is the active switch circuit or the passive switch circuit, the first expander circuit is a pull-up circuit or a pull-down circuit, and the second expander circuit is the pull-up circuit or the pull-down circuit; wherein the first expander circuit is the pull-down circuit under a condition that the second expander circuit is the pull-up circuit, or the first expander circuit is the pull-up circuit under a condition that the second expander circuit is the pull-down circuit; and under a condition that the active switch circuit or the passive switch circuit is connected to the pull-up circuit, the active switch circuit or the passive switch circuit outputs a first level state;

under a condition that the active switch circuit or the passive switch circuit is connected to the pull-down circuit, the active switch circuit or the passive switch circuit outputs a second level state;

under a condition that the active switch circuit is connected to the passive switch circuit, both the active switch circuit and the passive switch circuit output the first level state;

under a condition that two active switch circuits are connected to each other, the two active switch circuits output the first level state; and under a condition that two passive switch circuits are connected to each other, the two passive switch circuits output the second level state, wherein the second level state is a low level under a condition that the first level state is a high level, or the second level state is the high level under a condition that the first level state is the low level.

3. The recognition apparatus according to claim 2, further comprising a third expander circuit, wherein the third expander circuit is configured to be connected to a first slot; the first slot is connected to the first switch, and in the balance mode or the common mode, the cascade interface is connected to the first slot; and the first switch circuit outputs the different level states under the condition that the first switch circuit is connected to the switch interface of the second switch and under a condition that the first switch circuit is connected to the third expander circuit.

4. The recognition apparatus according to claim 3, wherein the second switch comprises a first switch interface; the second switch circuit is configured to be connected to the first switch interface;

in the balance mode, the first switch interface is connected to the interface of the second processor; in the common mode, the first switch interface is connected to the interface of the first processor; in the cascade mode, the cascade interface is connected to the first switch interface; and the first switch circuit outputs the different level states under a condition that the first switch circuit is connected to the second switch circuit and under the condition that the first switch circuit is connected to the third expander circuit.

5. The recognition apparatus according to claim 4, wherein the third expander circuit is the pull-down circuit under a condition that the first switch circuit is the passive switch circuit and the second switch circuit is the active switch circuit;

the third expander circuit is the pull-down circuit under a condition that the first switch circuit is the active switch circuit and the second switch circuit is the passive switch circuit;

the third expander circuit is the pull-down circuit under a condition that both the first switch circuit and the second switch circuit are active switch circuits; and the third expander circuit is the pull-up circuit under a condition that both the first switch circuit and the second switch circuit are passive switch circuits.

6. The recognition apparatus according to claim 3, further comprising a third switch circuit, the second switch comprises a first switch interface and a second switch interface, the second switch circuit is configured to be connected to the first switch interface and the third switch circuit is configured to be connected to the second switch interface; wherein in the balance mode, the first switch interface is connected to the interface of the second processor; in the common mode, the first switch interface is connected to the interface of the first processor; in the cascade mode, the cascade interface is connected to the second switch interface; and the first switch circuit outputs the different level states under a condition that the first switch circuit is connected to the third switch circuit and under the condition that the first switch circuit is connected to the third expander circuit.

7. The recognition apparatus according to claim 6, wherein the third expander circuit is the pull-down circuit under a condition that both the first switch circuit and the third switch circuit are active switch circuits;

the third expander circuit is the pull-down circuit under a condition that the first switch circuit is the active switch circuit and the third switch circuit is the passive switch circuit;

the third expander circuit is the pull-down circuit under a condition that the first switch circuit is the passive switch circuit and the third switch circuit is the active switch circuit; and the third expander circuit is the pull-up circuit under a condition that both the first switch circuit and the third switch circuit are passive switch circuits.

8. The recognition apparatus according to claim 2, further comprising a third switch circuit, the second switch comprises a first switch interface and a second switch interface, the second switch circuit is configured to be connected to the first switch interface, and the third switch circuit is configured to be connected to the second switch interface; wherein in the balance mode, the first switch interface is connected to the interface of the second processor;

in the common mode, the first switch interface is connected to the interface of the first processor;

in the cascade mode, the cascade interface is connected to the first switch interface or the second switch interface; and three level states output by the first switch circuit, the second switch circuit, and the third switch circuit under a condition that the cascade interface is connected to the first switch interface or the second switch interface are not totally the same as three level states output by the first switch circuit, the second switch circuit, and the third switch circuit in the balance mode or the common mode.

9. The recognition apparatus according to claim 8, wherein the first switch circuit outputs a same level state under a condition that the first switch circuit is connected to the second switch circuit and under a condition that the first switch circuit is connected to the third switch circuit.

10. The recognition apparatus according to claim 9, wherein the first switch circuit is the active switch circuit; or the first switch circuit is the passive switch circuit, and both the second switch circuit and the third switch circuit are active switch circuits.

11. The recognition apparatus according to claim 10, further comprising a third expander circuit, wherein the third expander circuit is the pull-down circuit;

the third expander circuit is configured to be connected to a first slot; and the first slot is connected to the first switch, and in the balance mode or the common mode, the cascade interface is connected to the first slot.

12. The recognition apparatus according to claim 9, further comprising a third expander circuit, wherein the third expander circuit is the pull-up circuit;

the third expander circuit is configured to be connected to a first slot;

the first slot is connected to the first switch, and in the balance mode or the common mode, the cascade interface is connected to the first slot; and the first switch circuit, the second switch circuit, and the third switch circuit are passive switch circuits.

13. The recognition apparatus according to claim 8, wherein the first switch circuit outputs the different level states under a condition that the first switch circuit is connected to the second switch circuit and under a condition that the first switch circuit is connected to the third switch circuit; and the third switch circuit outputs the different level states under a condition that the third switch circuit is connected to the first switch circuit and under a condition that the third switch circuit is not connected to the first switch circuit.

14. The recognition apparatus according to claim 13, further comprising a fourth expander circuit, wherein the fourth expander circuit is configured to be connected to a second slot; the second slot is connected to the second switch, and in the balance mode or the common mode, the second switch interface is connected to the second slot; and the third switch circuit outputs the different level states under a condition that the third switch circuit is connected to the first switch circuit and under a condition that the third switch circuit is connected to the fourth expander circuit.

15. The recognition apparatus according to claim 14, wherein the recognition apparatus further comprises a third expander circuit, the third expander circuit is the pull-down circuit, the fourth expander circuit is the pull-up circuit, the first switch circuit is the passive switch circuit, the second switch circuit is the active switch circuit, and the third switch circuit is the passive switch circuit; the recognition apparatus further comprises the third expander circuit, and the third expander circuit is configured to be connected to a first slot; and the first slot is connected to the first switch, and in the balance mode or the common mode, the cascade interface is connected to the first slot.

16. The recognition apparatus according to claim 14, wherein the recognition apparatus further comprises a third expander circuit, the third expander circuit is the pull-up circuit, the fourth expander circuit is the pull-down circuit, the first switch circuit is the passive switch circuit, the second switch circuit is the passive switch circuit, and the third switch circuit is the active switch circuit; and the third expander circuit is configured to be connected to a first slot; and the first slot is connected to the first switch, and in the balance mode or the common mode, the cascade interface is connected to the first slot.

17. The recognition apparatus according to claim 2, wherein the active switch circuit comprises a first transistor, a first voltage divider resistor, and a first current limiting resistor;

a first end of the first voltage divider resistor is connected to a power supply, and a second end of the first voltage divider resistor is connected to a control end of the first transistor;

a first end of the first current limiting resistor is connected to the power supply, and a second end of the first current limiting resistor is connected to a first end of the first transistor; and a second end of the first transistor is grounded, the control end of the first transistor controls whether the first end of the first transistor and the second end of the first transistor are conducted, the control end of the first transistor is configured to be connected to an interface of a switch, and the first end of the first transistor is configured to output a level state.

18. The recognition apparatus according to claim 2, wherein the passive switch circuit comprises a second transistor, a second voltage divider resistor, and a second current limiting resistor;

a first end of the second voltage divider resistor is connected to a control end of the second transistor, and a second end of the second voltage divider resistor is grounded;

a first end of the second current limiting resistor is connected to a power supply, and a second end of the second current limiting resistor is connected to a first end of the second transistor; and a second end of the second transistor is grounded, the control end of the second transistor controls whether the first end and the second end of the second transistor are conducted, and is configured to be connected to an interface of a switch, and the first end of the second transistor is configured to output a level state.

19. A server, characterized by comprising a first processor, a second processor, a first switch, a second switch, and a recognition apparatus for a topology; wherein the recognition apparatus comprises a first switch circuit, a second switch circuit, a first expander circuit, and a second expander circuit, wherein the first switch circuit is configured to be connected to a cascade interface of the first switch, and the second switch circuit is configured to be connected to a switch interface of the second switch; in a cascade mode, the cascade interface is connected to the switch interface of the second switch;

the first expander circuit is configured to be connected to an interface of the first processor, and the second expander circuit is configured to be connected to an interface of the second processor; in a balance mode, the switch interface of the second switch is connected to the interface of the second processor; in a common mode, the switch interface of the second switch is connected to the interface of the first processor;

the first switch circuit outputs different level states under a condition that the first switch circuit is connected to the switch interface of the second switch and under a condition that the first switch circuit is not connected to the switch interface of the second switch; and the second switch circuit outputs the different level states under a condition that the second switch circuit is connected to the first expander circuit and under a condition that the second switch circuit is connected to the second expander circuit.

20. The server according to claim 19, further comprising a baseboard management controller (BMC), wherein the BMC is connected to a controller of the recognition apparatus, and the BMC is configured to obtain a current topology mode determined by the controller.

* * * * *